US007006902B2

(12) United States Patent
Archer et al.

(10) Patent No.: US 7,006,902 B2
(45) Date of Patent: Feb. 28, 2006

(54) CONTROL SYSTEM AND METHOD FOR AN EQUIPMENT SERVICE VEHICLE

(75) Inventors: David W. Archer, Hortonville, WI (US); Duane R. Pillar, Oshkosh, WI (US); Bradley C. Squires, New London, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 77 days.

(21) Appl. No.: 10/460,756

(22) Filed: Jun. 12, 2003

(65) Prior Publication Data

US 2004/0039510 A1    Feb. 26, 2004

Related U.S. Application Data

(63) Continuation-in-part of application No. 10/325,439, filed on Dec. 20, 2002, which is a continuation-in-part of application No. 09/927,946, filed on Aug. 10, 2001, which is a continuation-in-part of application No. 09/500,506, filed on Feb. 9, 2000, which is a continuation-in-part of application No. 09/364,690, filed on Jul. 30, 1999, which is a continuation-in-part of application No. 09/384,393, filed on Aug. 27, 1999.

(60) Provisional application No. 60/360,479, filed on Feb. 28, 2002, provisional application No. 60/388,451, filed on Jun. 13, 2002, provisional application No. 60/342,292, filed on Dec. 21, 2001.

(51) Int. Cl.
*G05D 1/00* (2006.01)
*B60R 22/00* (2006.01)
*B60J 7/00* (2006.01)

(52) U.S. Cl. .............................. 701/1; 701/33; 701/36; 701/48; 180/11; 180/53.8; 180/89.13; 296/190.04; 296/193.04

(58) Field of Classification Search ................ 701/48, 701/36, 53, 33, 1; 169/16, 24, 61, 60, 62, 169/67, 68, 10, 74, 89, 30; 239/165, 172; 180/11, 53.1, 53.3, 53.4, 53.5, 53.8, 89.13; 293/190.04, 193.04
See application file for complete search history.

(56) References Cited

U.S. PATENT DOCUMENTS

| | | |
|---|---|---|
| 3,567,136 A | 3/1971 | Garrett |
| 3,762,478 A | 10/1973 | Cummins |
| 3,840,074 A | 10/1974 | Clark |
| 4,041,470 A | 8/1977 | Slane et al. |
| 4,162,714 A | 7/1979 | Correll |
| 4,180,803 A | 12/1979 | Wesemeyer et al. |
| 4,355,385 A | 10/1982 | Hampshire et al. |
| 4,453,672 A | 6/1984 | Garnett |
| 4,516,121 A | 5/1985 | Moriyama et al. |
| 4,535,846 A | 8/1985 | Gagliardo et al. |
| 4,542,802 A | 9/1985 | Garvey et al. |
| RE32,140 E | 5/1986 | Tokuda et al. |
| 4,596,192 A * | 6/1986 | Forster ...................... 104/307 |
| 4,639,609 A | 1/1987 | Floyd et al. |
| 4,646,232 A | 2/1987 | Chang et al. |
| 4,676,545 A * | 6/1987 | Bonfilio et al. ......... 296/193.04 |
| 4,678,041 A | 7/1987 | Staudinger |
| 4,744,218 A | 5/1988 | Edwards et al. |
| 4,760,275 A | 7/1988 | Sato et al. |
| 4,785,513 A | 11/1988 | Lee et al. |
| 4,809,177 A | 2/1989 | Windle et al. |
| 4,809,803 A | 3/1989 | Ahern et al. |
| 4,842,326 A * | 6/1989 | DiVito ................... 296/193.04 |
| 4,843,557 A | 6/1989 | Ina et al. |
| 4,860,633 A | 8/1989 | Wiethoff et al. |
| 4,864,154 A | 9/1989 | Copeland et al. |
| 4,864,568 A | 9/1989 | Sato et al. |
| 4,881,756 A * | 11/1989 | Kumasaka et al. ......... 280/785 |
| 4,894,781 A | 1/1990 | Sato et al. |
| 4,909,329 A | 3/1990 | Yoshida et al. |
| 4,941,546 A | 7/1990 | Nist et al. |
| 4,949,794 A | 8/1990 | Petit et al. |
| 4,949,808 A | 8/1990 | Garnett |
| 5,025,253 A | 6/1991 | DiLullo et al. |
| 5,091,856 A | 2/1992 | Hasegawa et al. |
| 5,189,617 A | 2/1993 | Shiraishi |
| 5,205,587 A * | 4/1993 | Orr ........................... 280/785 |

| | | | |
|---|---|---|---|
| 5,211,245 A | 5/1993 | Relyea et al. | |
| 5,300,918 A | 4/1994 | Becker | |
| 5,301,756 A * | 4/1994 | Relyea et al. | 169/24 |
| 5,301,997 A * | 4/1994 | Cudden | 296/182.1 |
| 5,310,239 A * | 5/1994 | Koske et al. | 296/26.08 |
| 5,365,436 A | 11/1994 | Schaller et al. | |
| 5,416,702 A | 5/1995 | Kitagawa et al. | |
| 5,420,828 A | 5/1995 | Geiger | |
| 5,463,992 A | 11/1995 | Swenson et al. | |
| 5,508,689 A * | 4/1996 | Rado et al. | 340/3.1 |
| 5,548,276 A | 8/1996 | Thomas | |
| 5,553,673 A * | 9/1996 | Hackman | 169/24 |
| 5,555,171 A | 9/1996 | Sonehara et al. | |
| 5,557,257 A | 9/1996 | Gieffers | |
| 5,573,300 A * | 11/1996 | Simmons | 296/193.04 |
| 5,595,398 A * | 1/1997 | Brown | 280/763.1 |
| 5,623,169 A | 4/1997 | Sugimoto et al. | |
| 5,626,194 A | 5/1997 | White | |
| 5,637,933 A | 6/1997 | Rawlings et al. | |
| 5,638,272 A | 6/1997 | Minowa et al. | |
| 5,657,224 A | 8/1997 | Lonn et al. | |
| 5,657,544 A | 8/1997 | Ota et al. | |
| 5,670,845 A | 9/1997 | Grant et al. | |
| 5,736,925 A | 4/1998 | Knauff et al. | |
| 5,739,592 A | 4/1998 | Rigsby et al. | |
| 5,754,021 A | 5/1998 | Kojima | |
| 5,779,300 A * | 7/1998 | McNeilus et al. | 296/183.1 |
| 5,781,437 A | 7/1998 | Wiemer et al. | |
| 5,788,158 A | 8/1998 | Relyea | |
| 5,793,648 A | 8/1998 | Nagle et al. | |
| 5,794,165 A | 8/1998 | Minowa et al. | |
| 5,819,188 A | 10/1998 | Vos | |
| 5,827,957 A | 10/1998 | Wehinger | |
| 5,836,398 A | 11/1998 | White | |
| 5,839,664 A | 11/1998 | Relyea | |
| 5,845,221 A | 12/1998 | Hosokawa et al. | |
| 5,848,365 A | 12/1998 | Coverdill | |
| 5,860,479 A | 1/1999 | LaFollette | |
| 5,864,781 A | 1/1999 | White | |
| 5,884,206 A | 3/1999 | Kim | |
| 5,890,080 A | 3/1999 | Coverdill et al. | |
| 5,896,418 A | 4/1999 | Hamano et al. | |
| 5,899,276 A | 5/1999 | Relyea et al. | |
| 5,919,237 A | 7/1999 | Balliet | |
| 5,948,025 A | 9/1999 | Sonoda | |
| 5,949,330 A | 9/1999 | Hoffman et al. | |
| 5,957,985 A | 9/1999 | Wong et al. | |
| 5,987,365 A | 11/1999 | Okamoto | |
| 5,997,338 A | 12/1999 | Pohjola | |
| 5,999,104 A | 12/1999 | Symanow et al. | |
| 6,012,004 A | 1/2000 | Sugano et al. | |
| 6,029,529 A | 2/2000 | Recker et al. | |
| 6,038,500 A | 3/2000 | Weiss | |
| 6,059,058 A * | 5/2000 | Dower | 180/65.3 |
| 6,066,075 A | 5/2000 | Poulton | |
| 6,070,538 A * | 6/2000 | Flamme et al. | 111/170 |
| 6,096,978 A | 8/2000 | Pohjola | |
| 6,101,917 A | 8/2000 | Klatte et al. | |
| 6,135,806 A | 10/2000 | Pohjola | |
| 6,141,610 A | 10/2000 | Rothert et al. | |
| 6,154,122 A | 11/2000 | Menze | |
| 6,157,875 A | 12/2000 | Hedman et al. | |
| 6,182,807 B1 | 2/2001 | Saito et al. | |
| 6,199,550 B1 | 3/2001 | Wiesmann et al. | |
| 6,223,104 B1 | 4/2001 | Kamen et al. | |
| 6,263,269 B1 * | 7/2001 | Dannenberg | 701/29 |
| 6,281,790 B1 | 8/2001 | Kimmel et al. | |
| 6,338,010 B1 | 1/2002 | Sparks et al. | |
| 6,356,826 B1 | 3/2002 | Pohjola | |
| 6,404,607 B1 | 6/2002 | Burgess et al. | |
| 6,405,114 B1 | 6/2002 | Priestley et al. | |
| 6,421,593 B1 * | 7/2002 | Kempen et al. | 701/48 |
| 6,430,488 B1 | 8/2002 | Goldman et al. | |
| 6,434,512 B1 | 8/2002 | Discenzo | |
| 6,496,775 B1 | 12/2002 | McDonald, Jr. et al. | |
| 6,501,368 B1 | 12/2002 | Wiebe et al. | |
| 6,553,290 B1 | 4/2003 | Pillar | |
| 6,580,953 B1 | 6/2003 | Wiebe et al. | |
| 6,611,755 B1 | 8/2003 | Coffee et al. | |
| 6,755,258 B1 | 6/2004 | Hunke et al. | |
| 6,757,597 B1 | 6/2004 | Yakes et al. | |
| 2002/0065594 A1 | 5/2002 | Squires et al. | |
| 2002/0175007 A1 * | 11/2002 | Strong | 180/54.1 |
| 2002/0196152 A1 | 12/2002 | Wilson et al. | |
| 2003/0010185 A1 | 1/2003 | O'Dwyer | |
| 2003/0025357 A1 * | 2/2003 | Fischer et al. | 296/190.08 |
| 2003/0066659 A1 | 4/2003 | Bissen et al. | |
| 2003/0080619 A1 * | 5/2003 | Bray et al. | 307/10.1 |
| 2003/0085562 A1 * | 5/2003 | Sparling | 280/789 |
| 2003/0090077 A1 * | 5/2003 | Colet | 280/124.1 |
| 2003/0130765 A1 | 7/2003 | Pillar et al. | |
| 2003/0158635 A1 | 8/2003 | Pillar et al. | |
| 2003/0158638 A1 | 8/2003 | Yakes et al. | |
| 2003/0158640 A1 | 8/2003 | Pillar et al. | |
| 2003/0163228 A1 | 8/2003 | Pillar et al. | |
| 2003/0163229 A1 | 8/2003 | Pillar et al. | |
| 2003/0163230 A1 | 8/2003 | Pillar et al. | |
| 2003/0171854 A1 | 9/2003 | Pillar et al. | |
| 2003/0195680 A1 | 10/2003 | Pillar | |
| 2003/0200015 A1 | 10/2003 | Pillar | |
| 2004/0002794 A1 | 1/2004 | Pillar et al. | |
| 2004/0019414 A1 | 1/2004 | Pillar et al. | |
| 2004/0024502 A1 | 2/2004 | Squires et al. | |
| 2004/0055802 A1 | 3/2004 | Pillar et al. | |
| 2004/0069865 A1 | 4/2004 | Rowe et al. | |
| 2004/0133319 A1 | 7/2004 | Pillar et al. | |
| 2004/0199302 A1 | 10/2004 | Pillar et al. | |
| 2005/0049944 A1 * | 3/2005 | Chernoff et al. | 705/28 |

FOREIGN PATENT DOCUMENTS

| | | |
|---|---|---|
| DE | 35 09 313 A1 | 9/1985 |
| DE | 34 34 287 A1 | 3/1986 |
| DE | 36 20 603 A1 | 1/1987 |
| DE | 38 43 043 A1 | 6/1990 |
| DE | 195 16 157 A1 | 11/1996 |
| DE | 196 01 282 C1 | 6/1997 |
| DE | 197 31 633 A1 | 1/1998 |
| DE | 198 25 690 A1 | 12/1999 |
| EP | 0 041 060 B1 | 12/1981 |
| EP | 0 266 704 B1 | 5/1988 |
| EP | 0 504 913 A1 | 9/1992 |
| EP | 0 564 943 B1 | 10/1993 |
| EP | 0 791 506 A2 | 8/1997 |
| EP | 1 088 960 A2 | 4/2001 |
| EP | 1 229 636 A2 | 8/2002 |
| SE | 507 046 C2 | 3/1998 |
| WO | WO 95/15594 A1 | 6/1995 |
| WO | WO 97/2965 A1 | 1/1997 |
| WO | WO 98/30961 A1 | 7/1998 |
| WO | WO 00/69662 A1 | 11/2000 |
| WO | WO 01/43827 A1 | 6/2001 |
| WO | WO 03/59455 A2 | 7/2003 |
| WO | WO 2003/059455 A3 | 7/2003 |

OTHER PUBLICATIONS

New Unimog Generation, Jun. 12, 2001, "www.mbspy.com/unimog200.htm".*

Aircraft Internal Time Division Multiplex Data Bus, MIL-STD-1553 (USAF); 29 pgs.; (Aug. 30, 1973).

Dana Corporation, Kalamazoo, Michigan, "Dana® Spicer® Central Tire Inflation System Specifications," www.dana.com, May 2000 (2 pages).

"HEMTT—Heavy Expanded Mobility Tactical Truck M977 Series Truck"; 12-page (as photocopied) brochure; Product of Oshkosh Truck Corporation; (Mar. 2000).
"M1070F Heavy Equipment Transporter & Trailer"; 8-page (as photocopied) brochure; Product of Oshkosh Truck Corporation; (Sep. 2001).
"Medium Tactical Vehicle Replacement"; 6-page (as photocopied) brochure; Product of Oshkosh Truck Corporation; (Aug. 2000).
"MTVR Dump Body Variant (Medium Tactical Vehicle Replacement)"; 2-page (as photocopied) brochure; Product of Oshkosh Truck Corporation; (Sep. 2001).
"MTVR Wrecker Variant (MK36 Wrecker Recovery Vehicle)"; 2-page (as photocopied) brochure; Product of Oshkosh Truck Corporation; (Sep. 2001).
"Oshkosh Trucks—75 Years of Specialty Truck Production"; Wright et al.; (pp. 119-126); Motorbooks International Publishers & Wholesalers (1992).
"Oshkosh Truck's Robotic Truck Qualifies for Pentagon's $1 Million Desert Race," Oshkosh Truck Corp., Mar. 12, 2004 (2 pages).
"Oshkosh Truck Rolls Out Next Generation of Command Zone Advanced Electronics System to Military Market," Oshkosh Truck Corp., Oct. 21, 2002 (2 pages).
"Oshkosh Truck Awarded Contract for U.S. Army Future Tactical Truck Concepts and Technology Evaluations," Oshkosh Truck Corp., Dec. 2, 2003 (2 pages).
"Oshkosh Truck and Ohio State University Design Robotic Vehicle to Compete in Desert Race," Oshkosh Truck Corp., Feb. 11, 2004 (2 pages).
"Oshkosh Showcases ProPulse Hybrid Electric System at Major Defense Exhibition," Oshkosh Truck Corp., Oct. 21, 2002 (1 page).
"Oshkosh Receives Federal Government Funding to Develop ProPulse Alternative Drive System for Military Trucks," Oshkosh Truck Corp., Aug. 31, 2001 (2 pages).
"Oshkosh Demonstrates ProPulse, the First Electric Hybrid—Drive Heavy Defense Truck," Oshkosh Truck Corp., Feb. 27, 2000-(2 pages).
"The One to Count on Through Hell and High Water"; 4-page (as photocopied) brochure; Product of Oshkosh Truck Corporation; (Sep. 2000).
European Search Report, EP 1 424 103 A3, which is related to a turret deployment system and method for a fire fighting vehicle, May 11, 2004, 3 pages.
Office Action from the Austrian Patent Office for Austrian Patent Application No. A 300/2003, related to a turret envelope control system and method for a fire fighting vehicle, Jul. 20, 2004, 6 pages (includes original and English translation).
Office Action from the Austrian Patent Office for Austrian Patent Application No. A 299/2003, related to a turret targeting system and method for a fire fighting vehicle, Jul. 20, 2004, 6 pages (includes original and English translation).
"Snozzle Model C-50A Operational Features," Crash Rescue Equipment Service, Inc., May 6, 2003 (7 pages).
"Snozzle Model P-50 Operational Features," Crash Rescue Equipment Service, Inc., May 6, 2003 (9 pages).
"Snozzle S2000-C Series Operational Features," Crash Rescue Equipment Service, Inc., May 6, 2003 (12 pages).
"Snozzle S2000-CA Series (Auto-Controls and Clash Point Protection) Operational Features," Crash Rescue Equipment Service, Inc., May 6, 2003 (13 pages).
TI-3000 Aircraft Rescue and Firefighting Vehicle Specifications, 2000 4 pages, Oshkosh Truck Corporation.

\* cited by examiner

*Primary Examiner*—Thomas G. Black
*Assistant Examiner*—Brian J. Broadhead
(74) *Attorney, Agent, or Firm*—Foley & Lardner LLP

(57) ABSTRACT

An aircraft rescue fire fighting vehicle comprises a chassis module, a cab module, and a control system. The control system further comprises a plurality of input devices, a plurality of output devices, a plurality of interface modules, and a communication network. The plurality of interface modules is distributed throughout the fire fighting vehicle and are coupled to each other by way of the communication network. The plurality of interface modules are each coupled to the plurality of input devices and output devices. The plurality of interface modules are operative to control the output devices based on input status information from the plurality of input devices. Some of the plurality of interface modules are mounted on the chassis module and other ones of the plurality of interface modules are mounted on the cab module. The cab module is mounted on top of the chassis and is modular in construction such that the cab module is mounted on top of the chassis module as a substantially complete stand-alone unit.

10 Claims, 17 Drawing Sheets

| 1520 | | | | | | | | | | |
|---|---|---|---|---|---|---|---|---|---|---|
| I-11 | I-12 | I-13 | I-14 | I-15 | IM-11 | O-11 | O-12 | O-13 |
| O-14 | O-15 | I-21 | I-22 | I-23 | I-24 | I-25 | IM-21 | IM-22 |
| O-21 | O-22 | O-23 | O-24 | O-25 | I-31 | I-32 | I-33 | I-34 |
| I-35 | O-31 | O-32 | O-33 | O34 | O-35 | I-41 | I-42 | I-43 |
| I-44 | I-45 | IM-41 | O41 | O-42 | O-43 | O-44 | O-45 | I-51 |
| I-52 | I-53 | I-54 | I-55 | O-51 | O-52 | O-53 | O-54 | O-55 |

FIG. 11

CONTROL SYSTEM AND METHOD FOR AN EQUIPMENT SERVICE VEHICLE

CROSS REFERENCE TO RELATED APPLICATIONS

This application claims priority to U.S. Prov. No. 60/388,451, filed Jun. 13, 2002, entitled "Control System and Method for an Equipment Service Vehicle," hereby expressly incorporated by reference. This application is also a continuation-in-part of U.S. Ser. No. 10/325,439, filed Dec. 20, 2002, entitled "Equipment Service Vehicle With Network-Assisted Vehicle Service and Repair," pending, which (1) is a continuation-in-part of U.S. Ser. No. 09/927,946, filed Aug. 10, 2001, entitled "Military Vehicle Having Cooperative Control Network With Distributed I/O Interfacing," pending, which is a continuation-in-part of U.S. Ser. No. 09/384,393, filed Aug. 27, 1999, entitled "Military Vehicle Having Cooperative Control Network With Distributed I/O Interfacing," now U.S. Pat. No. 6,421,593, which is a continuation-in-part of U.S. Ser. No. 09/364,690, filed Jul. 30, 1999, entitled "Firefighting Vehicle Having Cooperative Control Network With Distributed I/O Interfacing," abandoned; (2) is a continuation-in-part of U.S. Ser. No. 09/500,506, filed Feb. 9, 2000, entitled "Equipment Service Vehicle Having On-Board Diagnostic System," allowed; (3) claims priority to U.S. Prov. No. 60/342,292, filed Dec. 21, 2001, entitled "Vehicle Control and Monitoring System and Method;" (4) claims priority to U.S. Prov. No. 60/360,479, filed Feb. 28, 2002, entitled "Turret Control System and Method for a Fire Fighting Vehicle;" and (5) claims priority to U.S. Prov. No. 60/388,451, filed Jun. 13, 2002, entitled "Control System and Method for an Equipment Service Vehicle;" all of which are hereby expressly incorporated by reference.

FIELD OF THE INVENTION

The present invention relates control systems and methods for equipment service vehicles. In another embodiment, the present invention relates to a method of manufacturing an equipment service vehicle.

BACKGROUND OF THE INVENTION

Airport rescue fire fighting ("ARFF") vehicles carry a significant amount of electrical and electromechanical equipment that is useful in the task of fighting fires. For example, en route to a fire, ARFF vehicles utilize flashing emergency lights and emergency sirens to alert other vehicles or airplanes to the presence of the ARFF vehicles on the roadway and thereby to allow the ARFF vehicles to reach the scene of the fire more quickly and safely. Once at the scene of a fire, additional lighting systems are used that provide scene lighting, utility lighting, and so on. Additionally, ARFF vehicles have electromechanical systems that address specific needs on the vehicle. It is common for fire trucks to have well in excess of one hundred individual electrical output devices, especially if the fire truck includes an aerial system.

Typically, control systems for ARFF vehicles have been hardwired control systems in which wires are individually run between input devices, output devices, and control logic (e.g., relay logic). Due to the significant number of I/O devices on-board an ARFF vehicle, performing vehicle wiring of an ARFF vehicle has been a time consuming task. For example, to connect wiring from I/O devices in the cab area, it has generally not been possible to perform bench top wiring of a cab portion of the vehicle frame and then mount the cab portion on the vehicle. Rather, vehicle wiring must be performed with the cab frame already in place on the chassis, and with all the attendant difficulties of working in awkward positions and locations. An improved ARFF vehicle control systems that is easy to install would be advantageous.

Additionally, ARFF control systems have often been implemented as disparate systems. For example, many ARFF vehicles comprise a roof mounted articulated water tower and/or a low attach turret system, such as a bumper mounted turret. Generally, the control systems for these devices have been implemented as stand-alone control systems separate from the control system(s) for the other vehicle I/O devices described above. An improved ARFF vehicle control systems that intelligent and robust and that provides for overall control of a variety of different types of I/O devices would be advantageous.

SUMMARY OF THE INVENTION

According to a preferred embodiment, an airport rescue fire fighting vehicle comprises a turret system and a control system. The turret system further comprises an articulated boom assembly, a nozzle, and a penetrating probe. The nozzle and the penetrating probe are mounted at an end of the boom assembly. The penetrating probe is configured to penetrate a skin of an aircraft. The control system further comprises a plurality of input devices, a plurality of output devices, and a plurality of interface modules. The input and output devices are associated with the turret system. At least one of the plurality of interface modules is associated with the turret system. The plurality of interface modules are coupled to each other by way of a communication network. The plurality of interface modules each being coupled to respective ones of the plurality of input devices and the plurality of output devices. The plurality of interface modules being operative to control the output devices based on input status information from the plurality of input devices.

According to another preferred embodiment, an aircraft rescue fire fighting vehicle comprises a chassis module, a cab module, and a control system. The control system further comprises a plurality of input devices, a plurality of output devices, a plurality of interface modules, and a communication network. The plurality of interface modules is distributed throughout the fire fighting vehicle and are coupled to each other by way of the communication network. The plurality of interface modules are each coupled to the plurality of input devices and output devices. The plurality of interface modules are operative to control the output devices based on input status information from the plurality of input devices. Some of the plurality of interface modules are mounted on the chassis module and other ones of the plurality of interface modules are mounted on the cab module. The cab module is mounted on top of the chassis and is modular in construction such that the cab module is mounted on top of the chassis module as a substantially complete stand-alone unit.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIG. 11 is an I/O status table of FIG. 10 shown in greater detail;

DETAILED DESCRIPTION OF ADDITIONAL EMBODIMENTS

Patent application Ser. No. 09/384,393, filed Aug. 27, 1999, now U.S. Pat. No. 6,421,593 and the other patent applications mentioned above disclose various embodiments of a control system architecture in connection with various types of equipment service vehicles including airport rescue and fire fighting vehicles. For convenience, portions of the above-mentioned applications are repeated below, followed by a description of preferred embodiments of an airport rescue and fire fighting vehicle and related manufacturing techniques.

A. Fire Truck Control System

1. Architecture of Fire Truck Control System

Figure 1:
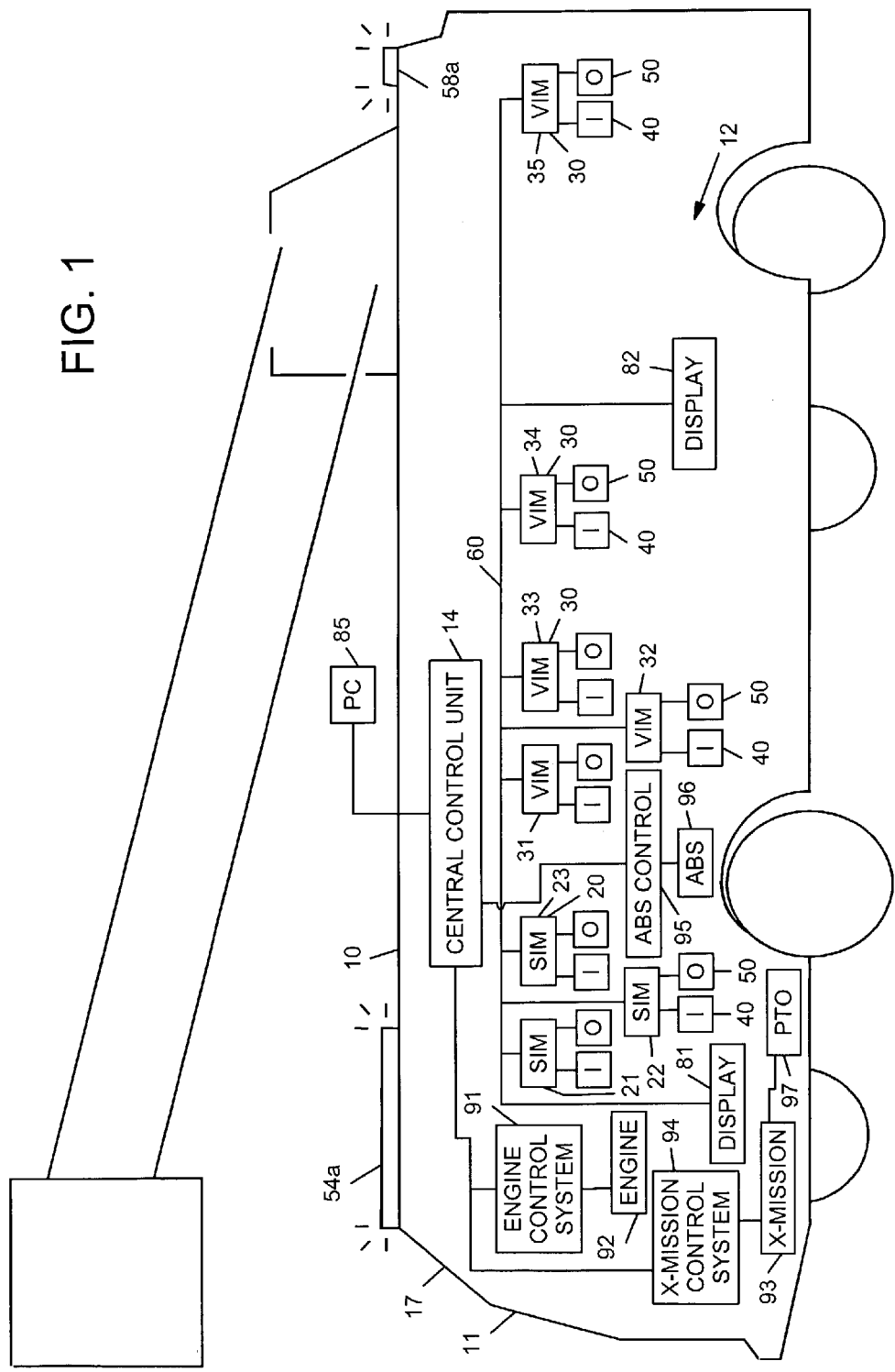
FIG. 1 is a schematic view of a fire truck having a control system according to one embodiment of the present invention.

Referring now to FIG. 1, a fire truck 10 having a control system 12 is illustrated. By way of overview, the control system 12 comprises a central control unit 14, a plurality of microprocessor-based interface modules 20 and 30, a plurality of input devices 40 and a plurality of output devices 50. The central control unit 14 and the interface modules 20 and 30 are connected to each other by a communication network 60.

More specifically, the central control unit 14 is a microprocessor-based device and includes a microprocessor 15 that executes a control program 16 (see FIG. 2) stored in memory of the central control unit 14. In general, the control unit 14 executes the program to collect and store input status information from the input devices 40, and to control the output devices 50 based on the collected status information. The control program may implement such features as an interlock system, a load manager, and a load sequencer. As described below, the central control unit 14 is preferably not connected to the I/O devices 40 and 50 directly but rather only indirectly by way of the interface modules 20 and 30, thereby enabling distributed data collection and power distribution. The I/O devices 40 and 50 are located on a chassis 11 of the fire truck 10, which includes both the body and the underbody of the fire truck 10.

In the illustrated embodiment, two different types of interface modules are used. The interface modules 20 interface mainly with switches and low power indicators, such as LEDs that are integrally fabricated with a particular switch and that are used to provide visual feedback to an operator regarding the state of the particular switch. Herein, the reference numeral "20" is used to refer to the interface modules 20 collectively, whereas the reference numerals 21, 22 and 23 are used to refer to specific ones of the interface modules 20.

The interface modules 30 interface with the remaining I/O devices 40 and 50 on the vehicle that do not interface to the interface modules 20. The interface modules 30 are distinguishable from the interface modules 20 mainly in that the interface modules 30 are capable of handling both analog and digital inputs and outputs, and in that they are capable of providing more output power to drive devices such as gauges, valves, solenoids, vehicle lighting and so on. The analog outputs may be true analog outputs or they may be pulse width modulation outputs that are used to emulate analog outputs. Herein, the reference numeral "30" is used to refer to the interface modules 30 collectively, whereas the reference numerals 31, 32, 33, 34 and 35 are used to refer to specific ones of the interface modules 30.

Although two different types of interface modules are used in the illustrated embodiment, depending on the application, it may be desirable to use only a single type of interface module in order to reduce inventory requirements. Alternatively, it may be desirable to use more than two different types of interface modules in order to allow the interface modules to be more optimally configured to perform different functions. Additionally, while in FIG. 1 three of the interface modules 20 and five of the interface modules 30 are shown, this arrangement is again simply one example. It may be desirable to provide each interface module with more I/O points in order to reduce the number of interface modules that are required, or to use more interface modules with a smaller number of I/O points in order to make the control system 12 more highly distributed. Of course, the number of interface modules will also be affected by the total number of I/O points in the control system.

FIG. 1 shows an approximate distribution of the interface modules 20 and 30 throughout the fire truck 10. In general, in order to minimize wiring, the interface modules 20 and 30 are placed so as to be located as closely as possible to the input devices 40 from which input status information is received and the output devices 50 that are controlled. As shown in FIG. 1, there is a large concentration of interface modules 20 and 30 near the front of the fire truck 10, with an additional interface module 34 at mid-length of the fire truck 10 and another interface module 35 at the rear of the fire truck 10. The large concentration of interface modules 20 and 30 at the front of the fire truck 10 is caused by the large number of switches (including those with integral LED feedback output devices) located in a cab of the fire truck 10, as well as the large number of other output devices (gauges, lighting) which tend to be located in the cab or otherwise near the front of the fire truck 10. The interface module 34 that is located in the middle of the truck is used in connection with I/O devices 40 and 50 that are located at the fire truck pump panel (i.e., the operator panel that has I/O devices for operator control of the fire truck's pump system). The interface module 35 that is located at the rear of the fire truck 10 is used in connection with lighting and other equipment at the rear of the fire truck 10.

Figure 2:
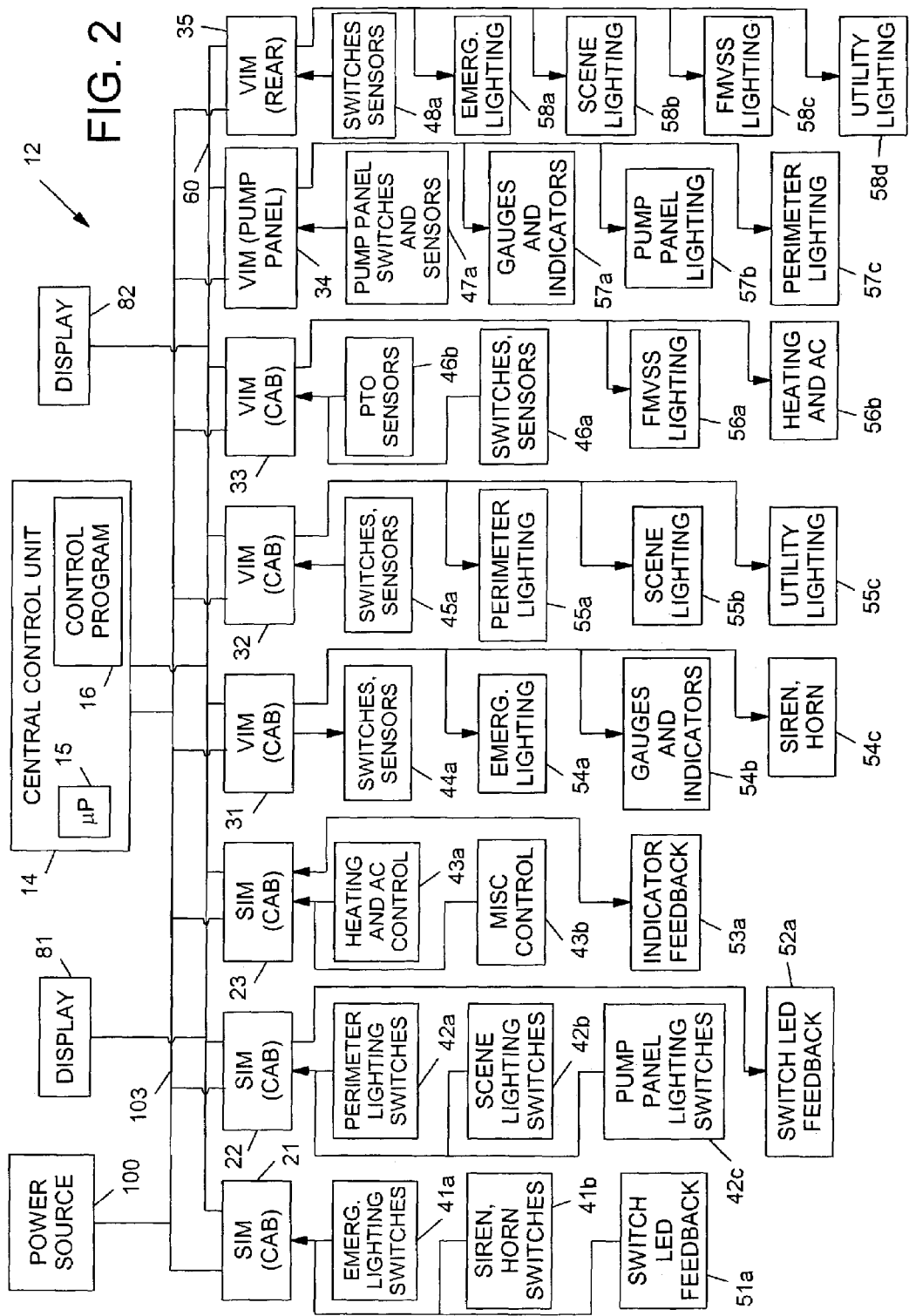
FIG. 2 is a block diagram of the control system of FIG. 1 showing selected aspects of the control system in greater detail.

The advantage of distributing the interface modules 20 and 30 in this manner can be more fully appreciated with reference to FIG. 2, which shows the interconnection of the interface modules 20 and 30. As shown in FIG. 2, the interface modules 20 and 30 receive power from a power source 100 by way of a power transmission link 103. The power transmission link 103 may comprise for example a single power line that is routed throughout the fire truck 10 to each of the interface modules 20 and 30. The interface modules then distribute the power to the output devices 50, which are more specifically designated with the reference numbers 51*a*, 52*a*, 53*a*, 54*a*–*c*, 55*a*–*c*, 56*a*–*b*, 57*a*–*c* and 58*a*–*d* in FIG. 2.

It is therefore seen from FIGS. 1 and 2 that the relative distribution of the interface modules 20 and 30 throughout the fire truck 10 in combination with the arrangement of the power transmission link 103 allows the amount of wiring on the fire truck 10 to be dramatically reduced. The power source 100 delivers power to the interface modules 20 and 30, which act among other things as power distribution centers, and not directly to the output devices 50. Because the interface modules 20 and 30 are located so closely to the I/O devices 40 and 50, most of the I/O devices can be connected to the interface modules 20 and 30 using only a few feet of wire or less. This eliminates the need for a wire harness that extends the length of the fire truck (about forty feet) to establish connections for each I/O devices 40 and 50 individually. Of course, each of the interface modules 20 and 30 may, in addition, be coupled to other non-local input devices and output devices. Further, the control system 12 can also include input devices and output devices which are not connected to the interface modules 20 and 30.

Continuing to refer to FIG. 2, the switch interface modules 20 and the interconnection of the interface modules 20 with various I/O devices will now be described in greater detail. The interface modules 20 are microprocessor-based, as previously noted, and include a microprocessor that executes a program to enable communication over the communication network 60, as detailed below.

The same or a different microprocessor of the interface modules 20 may also be used to process input signals received from the input devices 40. In particular, the interface modules 20 preferably perform debounce filtering of the switch inputs, so as to require that the position of the switch become mechanically stable before a switch transition is reported to the central control unit 14. For example, a delay of fifty milliseconds may be required before a switch transition is reported. Performing this filtering at the interface modules 20 reduces the amount of processing that is required by the central control unit 14 to interpret switch inputs, and also reduces the amount of communication that is required over the communication network 60 because each switch transition need not be reported.

Physically, the interface modules 20 may be placed near the headliner of a cab 17 of the fire truck 10. Traditionally, it is common practice to locate panels of switches along the headliner of the cab for easy access by an operator of the fire truck. Additionally, as detailed below, in the preferred embodiment, the interface modules 20 are connected to switches that have integrally fabricated LEDs for indicating the state of the output device controlled by the switch to provide maximum operator feedback. These LEDs are output devices which are connected to the interface modules 20. Therefore, by locating the interface modules near the headliner of the cab, the amount of wiring required to connect the interface modules 20 not only to the switches and but also to the LED indicators is reduced.

In the preferred embodiment, the interface modules 20 have between ten and twenty-five each of inputs and outputs and, more preferably, have sixteen digital (on/off switch) inputs and sixteen LED outputs. Most of these inputs and outputs are utilized in connection with switches having integrally fabricated LEDs. However, it should be noted that there need not be a one-to-one correspondence between the switches and the LEDs, and that the inputs and the outputs of the interface modules 20 need not be in matched pairs. For example, some inputs may be digital sensors (without a corresponding output device) and some of the outputs may be ordinary digital indicators (without a corresponding input device). Additionally, the LED indicators associated with the switch inputs for the interface module 21 could just as easily be driven by the interface module 23 as by the interface module 21, although this arrangement is not preferred. Of course, it is not necessary that all of the inputs and outputs on a given interface module 20 be utilized and, in fact, it is likely that some will remain unutilized.

One way of establishing a dedicated link between the I/O devices 40 and 50 and the interface modules 20 is through the use of a simple hardwired link. Considering for example an input device which is a switch, one terminal of the switch may be connected (e.g., by way of a harness connector) to an input terminal of the interface module 20 and the other terminal of the switch may be tied high (bus voltage) or low (ground). Likewise, for an output device which is an LED, one terminal of the LED may be connected to an output terminal of the interface module 20 and the other terminal of the LED may again be tied high or low. Other dedicated links, such as RF links, could also be used.

To provide maximum operator feedback, the LEDs that are located with the switches have three states, namely, off, on, and blinking. The off state indicates that the switch is off and therefore that the device controlled by the switch is off. Conversely, the on state indicates that the switch is on and that the device controlled by the switch is on. The blinking state indicates that the control system 12 recognizes that a switch is on, but that the device which the switch controls is nevertheless off for some other reason (e.g., due to the failure of an interlock condition, or due to the operation of the load manager or load sequencer). Notably, the blinking LED feedback is made possible by the fact that the LEDs are controlled by the control unit 14 and not directly by the switches themselves, since the switches themselves do not necessarily know the output state of the devices they control.

A specific example will now be given of a preferred interconnection of the interface modules 21, 22, and 23 with a plurality of I/O devices 40 and 50. Many or all of the I/O devices 40 and 50 could be the same as those that have previously been used on fire trucks. Additionally, it should be noted that the example given below is just one example, and that a virtually unlimited number of configurations are possible. This is especially true since fire trucks tend to be sold one or two at a time and therefore each fire truck that is sold tends to be unique at least in some respects.

In FIG. 2, the interface module 21 receives inputs from switches 41a that control the emergency lighting system of the fire truck. As previously noted, the emergency lighting system includes the flashing emergency lights (usually red and white) that are commonly associated with fire trucks and that are used to alert other motorists to the presence of the fire truck on the roadway or at the scene of a fire. One of the switches 41a may be an emergency master on/off (E-master) switch used to initiate load sequencing, as described in greater detail below. The interface module 21 may also be connected, for example, to switches 41b that control the emergency siren and horn. The interface module 21 is also connected to LEDs 51a that are integrally located in the switches 41a and 41b and that provide operator feedback regarding the positions of the switches 41a and 41b, as previously described.

The interface module 22 receives inputs from switches 42a that control lighting around the perimeter of the fire truck 10, switches 42b that control scene lighting, and switches 42c that control lighting which aids the operators in viewing gauges and other settings at the pump panel. The interface module 22 is also connected to LEDs 52a that are integrally located in the switches 42a, 42b and 42c and that provide operator feedback regarding the positions of the switches 42a, 42b and 42c.

The interface module 23 receives inputs from switches 43a that control heating and air conditioning, and switches 43b that controls miscellaneous other electrical devices. The interface module 23 is connected to LED indicators, some of which may be integrally located with the switches 43a and 43b and others of which may simply be an LED indicator that is mounted on the dashboard or elsewhere in the cab of the fire truck 10.

Continuing to refer to FIG. 2, the vehicle interface modules 30 and the interconnection of the interface modules 20 with various I/O devices will now be described in greater detail. As previously mentioned, the interface modules 30 are distinguishable from the interface modules 20 mainly in that the interface modules 30 are capable of handling both analog and digital inputs and outputs, and in that they are capable of providing more output power to drive output devices such as digitally-driven gauges, solenoids, and so on. The interface modules 30 preferably have between fifteen and twenty-five each inputs and outputs and, more preferably, have twenty inputs (including six digital inputs, two frequency counter inputs, and six analog inputs) and twenty outputs (including six outputs that are configurable as analog outputs).

Like the interface modules 20, the interface modules 30 are microprocessor-based and include a microprocessor that executes a program to enable communication over the communication network 60. The same or a different microprocessor of the interface modules 30 may also be used to process input signals received from the input devices 40 and to process output signals transmitted to the output devices 50.

For the interface modules 30, this processing includes not only debounce filtering, in the case of switch inputs, but also a variety of other types of processing. For example, for analog inputs, this processing includes any processing that is required to interpret the inputs from analog-to-digital (A/D) converters, including converting units. For frequency inputs, this processing includes any processing that is required to interpret inputs from frequency-to-digital converters, including converting units. This processing also includes other simple filtering operations. For example, in connection with one analog input, this processing may include notifying the central control unit 14 of the status of an input device only every second or so. In connection with another analog input, this processing may include advising the central control unit 14 only when the status of the input device changes by a predetermined amount. For analog output devices, this processing includes any processing that is required to interpret the outputs for digital-to-analog (D/A) converters, including converting units. For digital output devices that blink or flash, this processing includes implementing the blinking or flashing (i.e., turning the output device on and off at a predetermined frequency) based on an instruction from the central control unit 14 that the output device should blink or flash. In general, the processing by the interface modules 30 reduces the amount of information which must be communicated over the communication link, and also reduces the amount of time that the central control unit 14 must spend processing minor changes in analog input status.

Preferably, the configuration information required to implement the I/O processing that has just been described is downloaded from the central control unit 14 to each interface module 30 (and each interface module 20) at power-up. Additionally, the harness connector that connects to each of the interface modules 20 and 30 are preferably electronically keyed, such that being connected to a particular harness connector provides the interface modules 20 and 30 with a unique identification code (for example, by tying various connector pins high and low to implement a binary code). The advantage of this approach is that the interface modules 20 and 30 become interchangeable devices that are customized only at power-up. As a result, if one of the interface modules 30 malfunctions, for example, a new interface module 30 can be plugged into the control system 12, customized automatically at power-up (without user involvement), and the control system 12 then becomes fully operational. This enhances the maintainability of the control system 12.

A specific example will now be given of a preferred interconnection of the interface modules 31, 32, and 33 with a plurality of I/O devices 40 and 50. This example continues the example that was started in connection with the interface modules 21, 22, and 23. Again, it should be noted that the configuration described herein is just one example.

The interface modules 31, 32, 33, 34 and 35 all receive inputs from additional switches and sensors 44a, 45a, 46a, 47a and 48a. The switches may be additional switches that are located in the cab of the fire truck or elsewhere throughout the vehicle, depending on the location of the interface module. The sensors may be selected ones of a variety of sensors that are located throughout the fire truck. The sensors may be used to sense the mechanical status of devices on the fire truck, for example, whether particular devices are engaged or disengaged, whether particular devices are deployed, whether particular doors on the fire truck are open or closed, and so on. The sensors may also be used to sense fluid levels such as fuel level, transmission fluid level, coolant level, foam pressure, oil level, and so on.

In addition to the switches and sensors 44a, the interface module 31 is also connected to a portion 54a of the emergency lighting system. The emergency lighting system includes emergency lights (usually red and white) at the front, side and rear of the fire truck 10. The emergency lights may, for example, be in accordance with the guidelines provided by the National Fire Protection Association. Because the interface module 31 is located at the front of the fire truck, the interface module 31 is connected to the red and white emergency lights at the front of the fire truck.

The interface module 31 is also connected to gauges and indicators 54*b* which are located on the dashboard of the fire truck 10. The gauges may indicate fluid levels such as fuel level, transmission fluid level, coolant level, foam pressure, oil level and so on. The indicators may include, for example, indicators that are used to display danger, warning and caution messages, warning lights, and indicators that indicate the status of various mechanical and electrical systems on the fire truck. The interface module 31 may also be connected, for example, to an emergency sound system including an emergency siren and emergency air horns 54*c*, which are used in combination with the emergency lights 54*a*.

In addition to the switches and sensors 45*a*, the interface module 32 is also connected to perimeter lighting 55*a*, scene lighting 55*b* and utility lighting 55*c*. The perimeter lighting 55*a* illuminates the perimeter of the fire truck 10. The scene lighting 55*b* includes bright flood lights and/or spot lights to illuminate the work area at a fire. The utility lighting 55*c* includes lighting used to light operator panels, compartments and so on of the fire truck 10.

In addition to the switches and sensors 46*a*, the interface module 33 is also connected to PTO sensors 46*b*. The PTO sensors 46*b* monitor the status of a power take-off mechanism 97 (see FIG. 1), which diverts mechanical power from the engine/transmission from the wheels to other mechanical subsystems, such as the pump system, an aerial system and so on. The interface module 33 is also connected to a portion 56*a* of the FMVSS (Federal Motor Vehicle Safety Standard) lighting. The FMVSS lighting system includes the usual types of lighting systems that are commonly found on most types of vehicles, for example, head lights, tail lights, brake lights, directional lights (including left and right directionals), hazard lights, and so on. The interface module 33 is also connected to the heating and air conditioning 56*b*.

In addition to the switches and sensors 47*a*, the interface module 34, which is disposed near the pump panel, is connected to pump panel switches and sensors 47*a*, pump panel gauges and indicators 57*a*, pump panel lighting 57*b*, and perimeter lighting 57*c*. The pump system may be manually controlled or may be automatically controlled through the use of electronically controlled valves. In either case, the various fluid pressures are measured by sensors and displayed on the gauges and indicators 57*a*.

Finally, in addition to the switches and sensors 48*a*, the interface module 35 is also connected to emergency lighting 58*a*, scene lighting 58*b*, FMVSS lighting 58*c*, and the utility lighting 58*d*. These lighting systems have been described above.

The interface modules 20 and the interface modules 30 are connected to the central control unit 14 by the communication network 60. The communication network may be implemented using a network protocol, for example, which is in compliance with the Society of Automotive Engineers (SAE) J1708/1587 and/or J1939 standards. The particular network protocol that is utilized is not critical, although all of the devices on the network should be able to communicate effectively and reliably.

The transmission medium may be implemented using copper or fiber optic cable. Fiber optic cable is particularly advantageous in connection with fire trucks because fiber optic cable is substantially immune to electromagnetic interference, for example, from communication antennae on mobile news vehicles, which are common at the scenes of fires. Additionally, fiber optic cable is advantageous because it reduces RF emissions and the possibility of short circuits as compared to copper-based networks. Finally, fiber optic cable is advantageous because it reduces the possibility of electrocution as compared to copper in the event that the cable accidentally comes into contact with power lines at the scene of a fire.

Also connected to the communication network 60 are a plurality of displays 81 and 82. The displays 81 and 82 permit any of the data collected by the central control unit 14 to be displayed to the firefighters in real time. In practice, the data displayed by the displays 81 and 82 may be displayed in the form of text messages and may be organized into screens of data (given that there is too much data to display at one time) and the displays 81 and 82 may include membrane pushbuttons that allow the firefighters to scroll through, page through, or otherwise view the screens of data that are available. Additionally, although the displays 81 and 82 are both capable of displaying any of the information collected by the central control unit 14, in practice, the displays 81 and 82 are likely to be used only to display selected categories of information. For example, assuming the display 81 is located in the cab and the display 82 is located at the pump panel, the display 81 is likely to be used to display information that pertains to devices which are controlled from within the cab, whereas the display 82 is likely to be used to display information pertaining to the operation of the pump panel. Advantageously, the displays 81 and 82 give firefighters instant access to fire truck information at a single location, which facilitates both normal operations of the fire truck as well as troubleshooting if problems arise.

Referring again to FIG. 1, also shown in FIG. 1 is a personal computer 85 which is connected to the control unit 14 by way of a communication link 86, which may be a modem link, an RS-232 link, an Internet link, and so on. The personal computer 85 allows diagnostic software to be utilized for remote or local troubleshooting of the control system 12, for example, through direct examination of inputs, direct control of outputs, and viewing and controlling internal states, including interlock states. Because all I/O status information is stored in the central control unit 14, this information can be easily accessed and manipulated by the personal computer 85. If a problem is encountered, the personal computer can be used to determine whether the central control unit 14 considers all of the interface modules 20 and 30 to be "on-line" and, if not, the operator can check for bad connections and so on. If a particular output device is not working properly, the personal computer 85 can be used to trace the I/O status information from the switch or other input device through to the malfunctioning output device. For example, the personal computer 85 can be used to determine whether the switch state is being read properly, whether all interlock conditions are met, and so on.

The personal computer 85 also allows new firmware to be downloaded to the control unit 14 remotely (e.g., from a different city or state or other remote location by way of the Internet or a telephone link) by way of the communication link 86. The firmware can be firmware for the control unit 14, or it can be firmware for the interface modules 20 and 30 that is downloaded to the control unit 14 and then transmitted to the interface modules 20 and 30 by way of the communication network 60.

Finally, also shown in FIG. 1 are several additional systems which will now be briefly described before proceeding to a discussion of the operation of the control system 12. In particular, FIG. 1 shows an engine system including an engine 92 and an engine control system 91, a transmission system including a transmission 93 and a transmission control system 94, and an anti-lock brake system including an anti-lock brake control system 95 and anti-lock brakes 96. The transmission 93 is mechanically coupled to the engine 92, and is itself further mechanically coupled to a PTO system 97. The PTO system 97 allows mechanical power from the engine to be diverted to water pumps, aerial drive mechanisms, stabilizer drive mechanisms, and so on. In combination, the engine system, the transmission system and the PTO system form the power train of the fire truck 10.

The control systems 92, 94 and 95 may be connected to the central control unit 14 using the same or a different communication network than is used by the interface modules 30 and 40. In practice, the control systems 92, 94 and 95 are likely to be purchased as off-the-shelf systems, since most fire truck manufacturers purchase rather than manufacture engine systems, transmission systems and anti-lock brake systems. As a result, it is likely that the control systems 92, 94 and 95 will use a variety of different communication protocols and therefore that at least one additional communication network will be required.

By connecting the systems 92, 94 and 95 to the central control unit 14, an array of additional input status information becomes available to the control system 12. For example, for the engine, this allows the central control unit 14 to obtain I/O status information pertaining to engine speed, engine hours, oil temperature, oil pressure, oil level, coolant level, fuel level, and so on. For the transmission, this allows the central control unit 14 to obtain, for example, information pertaining transmission temperature, transmission fluid level and/or transmission state (1st gear, 2nd gear, and so on). Assuming that an off-the-shelf engine or transmission system is used, the information that is available depends on the manufacturer of the system and the information that they have chosen to make available.

Connecting the systems 92, 94 and 95 to the central control unit 14 is advantageous because it allows information from these subsystems to be displayed to firefighters using the displays 81 and 82. This also allows the central control unit 14 to implement various interlock conditions as a function of the state of the transmission, engine or brake systems. For example, in order to turn on the pump system (which is mechanically driven by the engine and the transmission), an interlock condition may be implemented that requires that the transmission be in neutral or 4th lockup (i.e., fourth gear with the torque converter locked up), so that the pump can only be engaged when the wheels are disengaged from the power train. The status information from these systems can therefore be treated in the same manner as I/O status information from any other discrete I/O device on the fire truck 10. It may also be desirable to provide the central control unit 14 with a limited degree of control over the engine and transmission systems, for example, enabling the central control unit 14 to issue throttle command requests to the engine control system 91. This allows the central control unit to control the speed of the engine and therefore the voltage developed across the alternator that forms part of the power source 100.

2. Aerial Control

Figure 3:
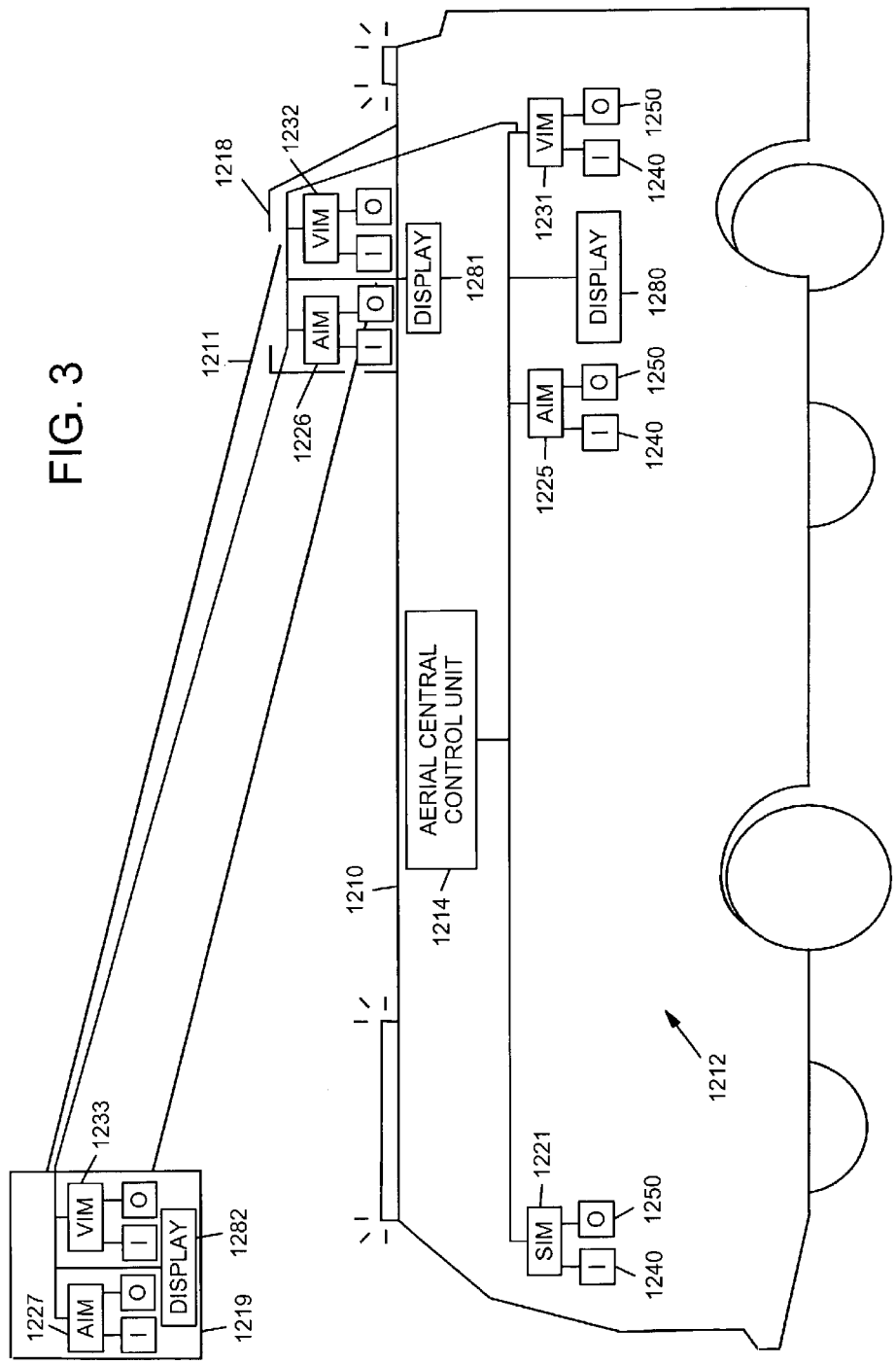
FIG. 3 is a schematic view of an aerial device having a control system according to another embodiment of the present invention.
Figure 4:
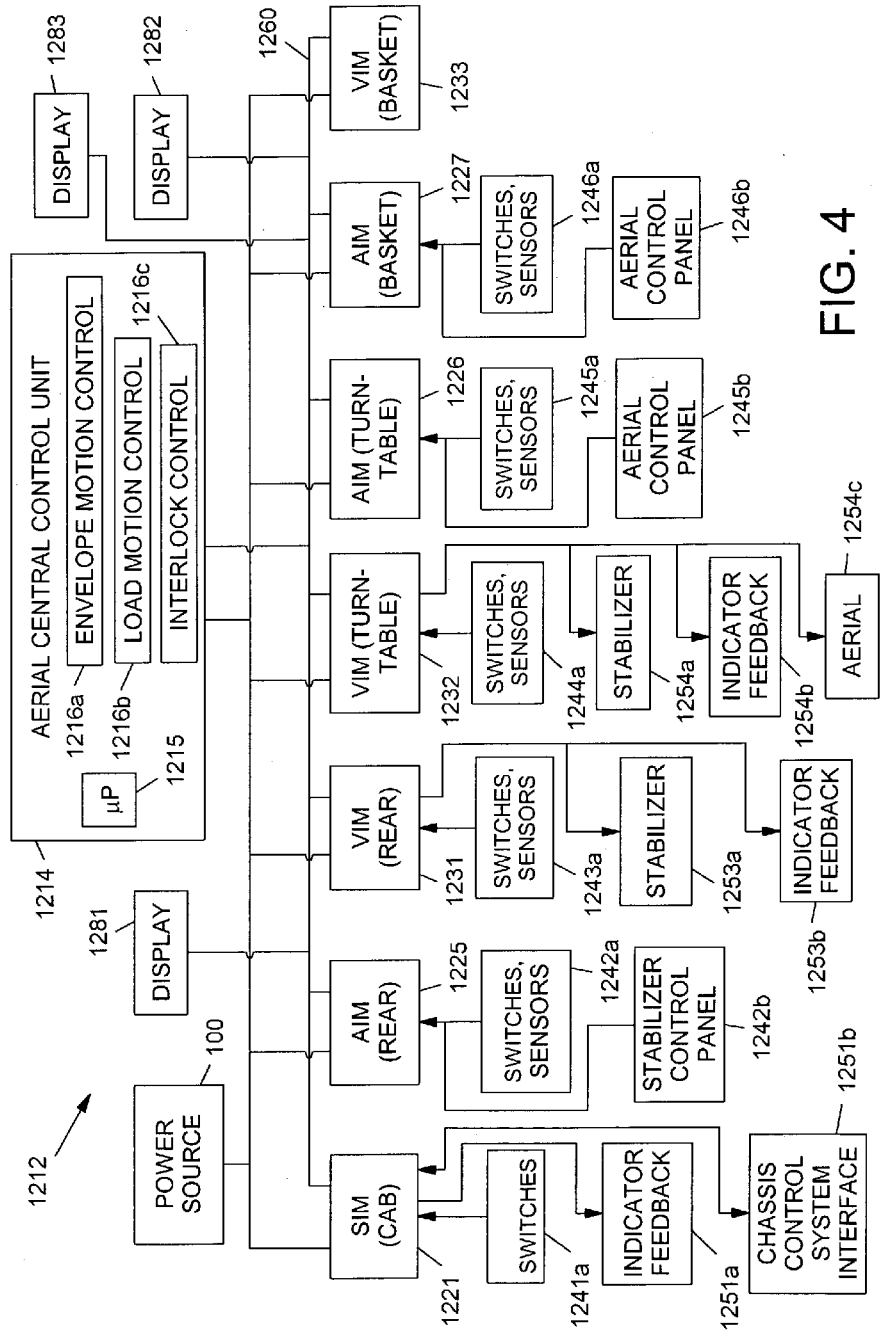
FIG. 4 is a more detailed block diagram of the control system of FIG. 3.

Referring now to FIGS. 3–4, a preferred embodiment of a fire truck 1210 with an aerial 1211 having an aerial control system 1212 is illustrated. By way of overview, the control system 1212 comprises an aerial central control unit 1214, a plurality of microprocessor-based interface modules 1220, 1230 and 1235, a plurality of input devices 1240, and a plurality of output devices 1250. The central control unit 1214 and the interface modules 1220, 1230 and 1235 are connected to each other by a communication network 1260.

The control system 1212 is similar in most respect to the control system 12, with the primary difference being that the control system 1212 is used to control the output devices 1250 on the aerial 1211 based on input status information from the input devices 1240, rather than to control the output devices 50 on the chassis 11. The interface modules 1220 and 1230 may be identical to the interface modules 20 and 30, respectively, and the central control unit 1214 may be identical to the central control unit 14 except that a different control program is required in connection with the aerial 1211. Accordingly, the discussion above regarding the interconnection and operation of the interface modules 20 and 30 with the input devices 40 and output devices 50 applies equally to the central control unit 1214, except to the extent that the control system 1212 is associated with the aerial 1211 and not with the chassis 11.

The aerial control system 1212 also includes the interface modules 1225–1227, which are similar to the interface modules 20 and 30 except that different I/O counts are utilized. In the preferred embodiment, the interface modules 1225–1227 have twenty-eight switch inputs (two of which are configurable as frequency inputs). As previously noted, rather than using several different types of interface modules, it may be desirable to use only a single type of interface module in order to reduce inventory requirements. Additionally, the number of interface modules and the I/O counts are simply one example of a configuration that may be utilized.

It is desirable to use a control system 1212 for the aerial 1211 which is separate from the control system 12 in order to provide a clear separation of function between systems associated with the aerial 1211 and systems associated with the chassis 11. Additionally, as a practical matter, many fire trucks are sold without aerials and therefore providing a separate aerial control system enables a higher level commonality with respect to fire trucks that have aerials and fire trucks that do not have aerials.

A specific example will now be given of a preferred interconnection of the interface modules with a plurality of input devices 1240 and output devices 1250. The interface module 1221 receives inputs from switches 1241a which may include for example an aerial master switch that activates aerial electrical circuits, an aerial PTO switch that activates the transmission to provide rotational input power for the hydraulic pump, and a platform leveling switch that momentarily activates a platform (basket) level electrical circuit to level the basket relative to the current ground grade condition. The LED indicators 1251 provide visual feedback regarding the status of the input switches 1241a.

The interface modules 1225 and 1231 are located near a ground-level control station at a rear of the fire truck 10. The interface modules 1225 and 1231 receive inputs from switches 1242a and 1243a that include, for example, an auto level switch that activates a circuit to level the fire truck using the stabilizer jacks and an override switch that overrides circuits for emergency operation. The interface modules 1225 and 1231 may also receive inputs from an operator panel such as a stabilizer control panel 1242b, which includes switches that control the raising and lowering of front and rear stabilizer jacks, and the extending and retracting of front and rear stabilizer jacks. The stabilizer is an outrigger system which is deployed to prevent the fire truck from becoming unstable due to the deployment of an aerial system (e.g., an eighty-five foot extendable ladder). The interface module 1231 may drive outputs that are used to control deployment the stabilizer, which can be deployed anywhere between zero and five feet.

The interface modules 1226 and 1232 are located near a turn table 1218 at the rear of the fire truck 10. The interface modules may receive inputs from switches and sensors 1244a and 1245a, as well as switches that are part of an aerial control panel 1245b and are used to control the extension/retraction, raising/lowering, and rotation of the aerial 1211. The interface modules 1226 and 1232 drive outputs that control the extension/retraction, raising/lowering, and rotation of the aerial 1211, as well as LED indicators 1254b that provide operator feedback regarding the positions of switches and other I/O status information. The interface modules 1227 and 1233 are located in the basket of the aerial and provide duplicate control for the extension/retraction, raising/lowering, and rotation of the aerial.

Additional inputs and outputs 1251b may be used to establish a communication link between the control system 12 and the control system 1212. In other words, the digital on/off outputs of one control system can be connected to the switch inputs of the other control system, and vice versa. This provides for a mechanism of transferring I/O status information back and forth between the two control systems 12 and 1212.

The control system 1212 has complete motion control of the aerial 1211. To this end, the control program 1216 includes an envelope motion controller 1216a, load motion controller 1216b and interlock controller 1216c. Envelope motion control refers to monitoring the position of the aerial and preventing the aerial from colliding with the remainder of the fire truck 10, and otherwise preventing undesirable engagement of mechanical structures on the fire truck due to movement of the aerial. Envelope motion control is implemented based on the known dimensions of the aerial 1211 and the known dimensions and position of other fire truck structures relative to the aerial 1211 (e.g., the position and size of the cab 17 relative to the aerial 1211) and the position of the aerial 1211 (which is measured with feedback sensors 1244a and 1245a). The control system 1212 then disallows inputs that would cause the undesirable engagement of the aerial 1211 with other fire truck structures.

Load motion control refers to preventing the aerial from extending so far that the fire truck tips over due to unbalanced loading. Load motion control is implemented by using an appropriate sensor to measure the torque placed on the cylinder that mechanically couples the aerial 1211 to the remainder of the fire truck. Based on the torque and the known weight of the fire truck, it is determined when the fire truck is close to tipping, and warnings are provided to the operator by way of text messages and LED indicators.

Interlock control refers to implementing interlocks for aerial systems. For example, an interlock may be provided that require the parking brake be engaged before allowing the aerial to move, that require the stabilizers to be extended and set before moving the aerial 1211, that require that the aerial PTO be engaged before attempting to move the aerial, and so on.

In another embodiment, the portion of the communication network that connects the interface modules 1227 and 1233 to the remainder of the control system 1212 may be implemented using a wireless link. The wireless link may be implemented by providing the interface modules 1227 and 1233 with wireless RF communication interfaces such as a Bluetooth interfaces. A wireless link may be advantageous in some instances in order to eliminate maintenance associated with the network harness that extends from the main vehicle body along the articulated arm formed by the aerial 1211 to the interface modules 1227 and 1233. Also, given that portions of the network harness can be positioned at significant distances from the center of gravity of the vehicle 10, the use of a wireless link is advantageous in that it reduces the weight of the articulated arm, thereby enhancing the mechanical stability of the vehicle. In this regard, it may also be noted that it is possible to provide all of the interface modules on the vehicle 10 with the ability to communicate wirelessly with each other (e.g., using Bluetooth), thereby completely eliminating the need for a separate network harness.

Advantageously, therefore, the control system makes the operation of the aerial much safer. For example, with respect to load motion control, the control system 1212 automatically alerts firefighters if the extension of the aerial is close to causing the fire truck to tip over. Factors such as the number and weight of people in the basket 1219, the amount and weight of equipment in the basket 1219, the extent to which the stabilizers are deployed, whether and to what extent water is flowing through aerial hoses, and so on, are taken into account automatically by the torque sensors associated with the cylinder that mounts the aerial to the fire truck. This eliminates the need for a firefighter to have to monitor these conditions manually, and makes it possible for the control system 1212 to alert an aerial operator to unsafe conditions, and puts less reliance on the operator to make sure that the aerial is operating under safe conditions.

3. Alternative Control System Architecture

Figure 5:
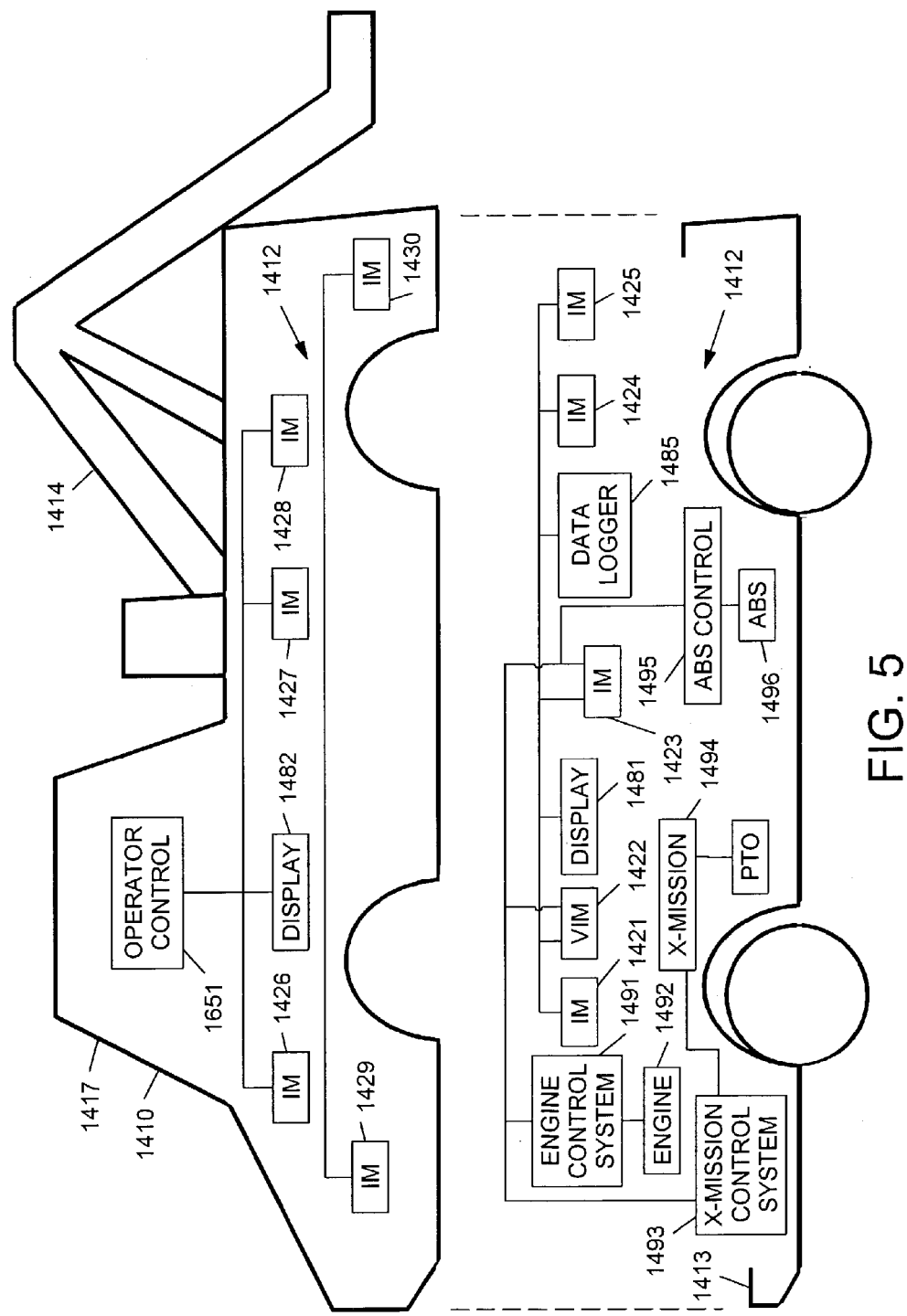
FIG. 5 is a schematic view of a vehicle having a control system according to another embodiment of the present invention.

Referring now to FIG. 5, an architecture for an alternative control system 1412 according to another preferred embodiment of the invention is illustrated. By way of overview, the control system 1412 comprises a plurality of microprocessor-based interface modules 1420, a plurality of input and output devices 1440 and 1450 (see FIG. 7) that are connected to the interface modules 1420, and a communication network 1460 that interconnects the interface modules 1420. The control system 1412 is generally similar to the control system 12, but includes several enhancements. The control system 1412 preferably operates in the same manner as the control system 12 except to the extent that differences are outlined are below.

Figure 6:
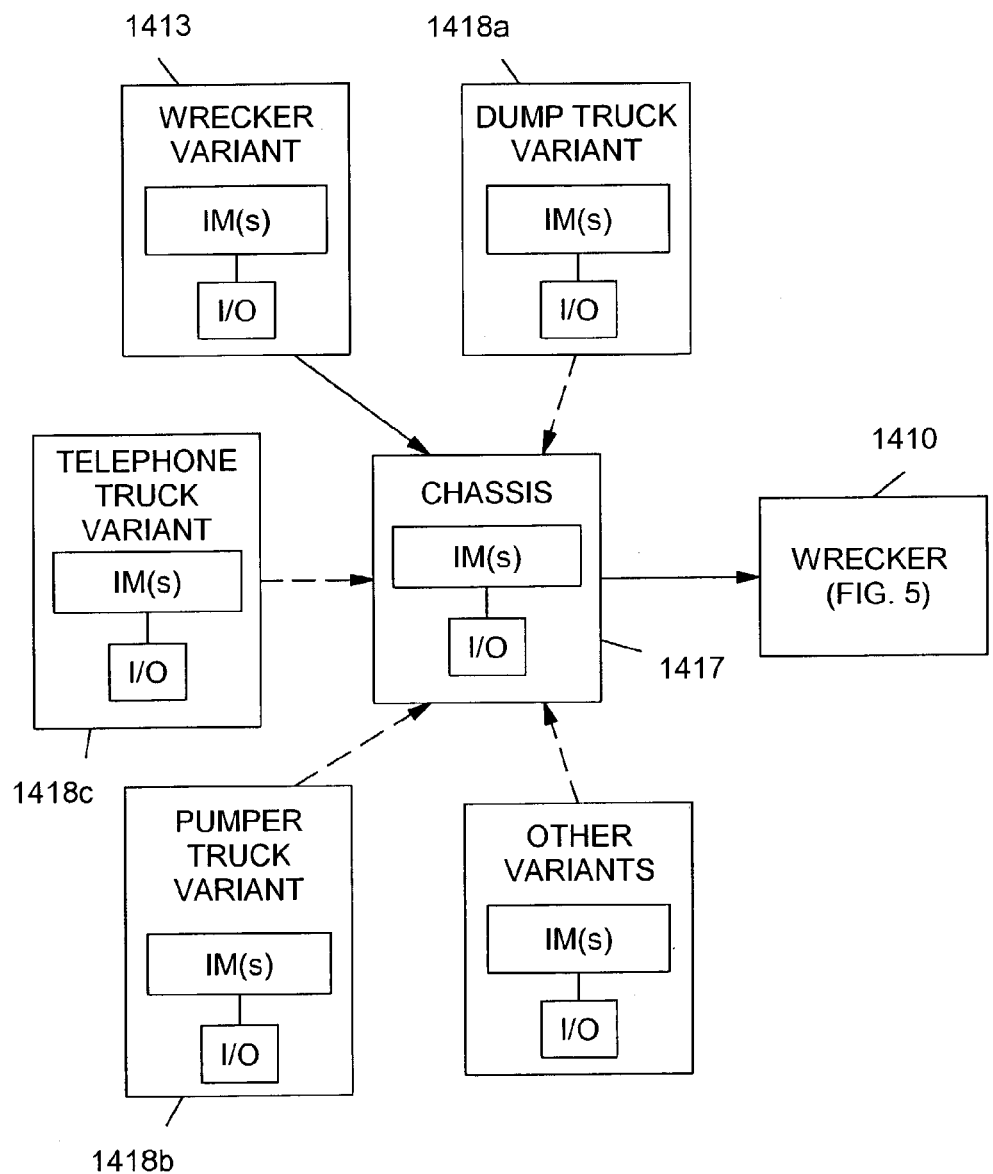
FIG. 6 is an overview of a preferred variant vehicle system.

More specifically, in the illustrated embodiment, the control system 1412 is used in connection with a vehicle 1410 which is a multipurpose modular vehicle. As is known, a multipurpose module vehicle comprises a chassis and a variant module that is capable of being mounted on the chassis, removed, and replaced with another variant module, thereby allowing the same chassis to be used for different types of vehicles with different types of functionality depending on which variant module is mounted to the chassis. In the illustrated embodiment, the vehicle 1410 is a wrecker and includes a wrecker variant module 1413 mounted on a chassis (underbody) 1417 of the vehicle 1410. The weight of the variant module 1413 is supported by the chassis 1417. The variant module 1413 includes a mechanical drive device 1414 capable of imparting motion to solid or liquid matter that is not part of the vehicle 1410 to provide the vehicle 1410 with a particular type of functionality. In FIG. 5, where the variant module 1413 is a wrecker variant, the mechanical drive device is capable of imparting motion to a towed vehicle. As shown in FIG. 6, the variant module 1413 is removable and replaceable with other types of variant modules, which may include a dump truck variant 1418*a*, a water pump variant 1418*b*, a telephone variant 1418*c*, and so on. Thus, for example, the wrecker variant 1413 may be removed and replaced with a water pump variant 1418*b* having a different type of drive mechanism (a water pump) to provide a different type of functionality (pumper functionality). The I/O devices 1440 and 1450 used by the vehicle 1410 include devices that are the same as or similar to the non-fire truck specific I/O devices of FIGS. 1–4 (i.e., those types of I/O devices that are generic to most types of vehicles), as well as I/O devices that are typically found on the specific type of variant module chosen (in FIG. 5, a wrecker variant).

The interface modules 1420 are constructed in generally the same manner as the interface modules 20 and 30 and each include a plurality of analog and digital inputs and outputs. The number and type of inputs and outputs may be the same, for example, as the vehicle interface modules 30. Preferably, as described in greater detail below, only a single type of interface module is utilized in order to increase the field serviceability of the control system 1412. Herein, the reference numeral 1420 is used to refer to the interface modules 1420 collectively, whereas the reference numerals 1421–1430 are used to refer to specific ones of the interface modules 1420. The interface modules are described in greater detail in connection with FIGS. 7–9.

Also connected to the communication network 1460 are a plurality of displays 1481 and 1482 and a data logger 1485. The displays 1481 and 1482 permit any of the data collected by the control system 1412 to be displayed in real time, and also display warning messages. The displays 1481 and 1482 also include membrane pushbuttons that allow the operators to scroll through, page through, or otherwise view the screens of data that are available. The membrane pushbuttons may also allow operators to change values of parameters in the control system 1412. The data logger 1485 is used to store information regarding the operation of the vehicle 1410. The data logger 1485 may also be used as a "black box recorder" to store information logged during a predetermined amount of time (e.g., thirty seconds) immediately prior to the occurrence of one or more trigger events (e.g., events indicating that the vehicle 1410 has been damaged or rendered inoperative, such as when an operational parameter such as an accelerometer threshold has been exceeded).

Finally, FIG. 5 shows an engine system including an engine 1492 and an engine control system 1491, a transmission system including a transmission 1493 and a transmission control system 1494, and an anti-lock brake system including an anti-lock brake control system 1495. These systems may be interconnected with the control system 1412 in generally the same manner as discussed above in connection with the engine 92, the engine control system 91, the transmission 93, the transmission control system 94, and the anti-lock brake system 36 of FIG. 1.

Figure 7:
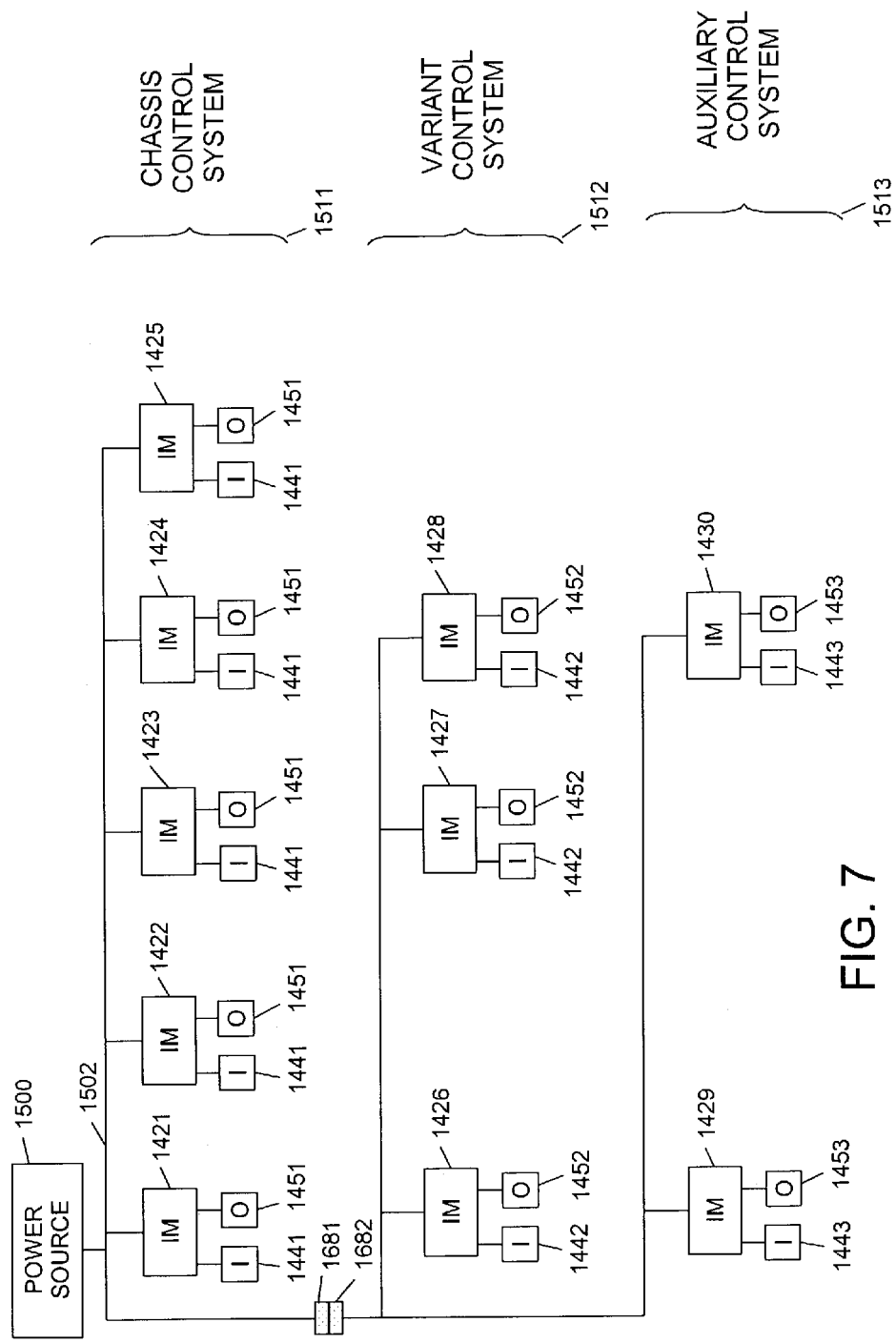
FIGS. 7–8 are block diagrams of the control system of FIG. 5 showing selected aspects of the control system in greater detail.
Figure 8:
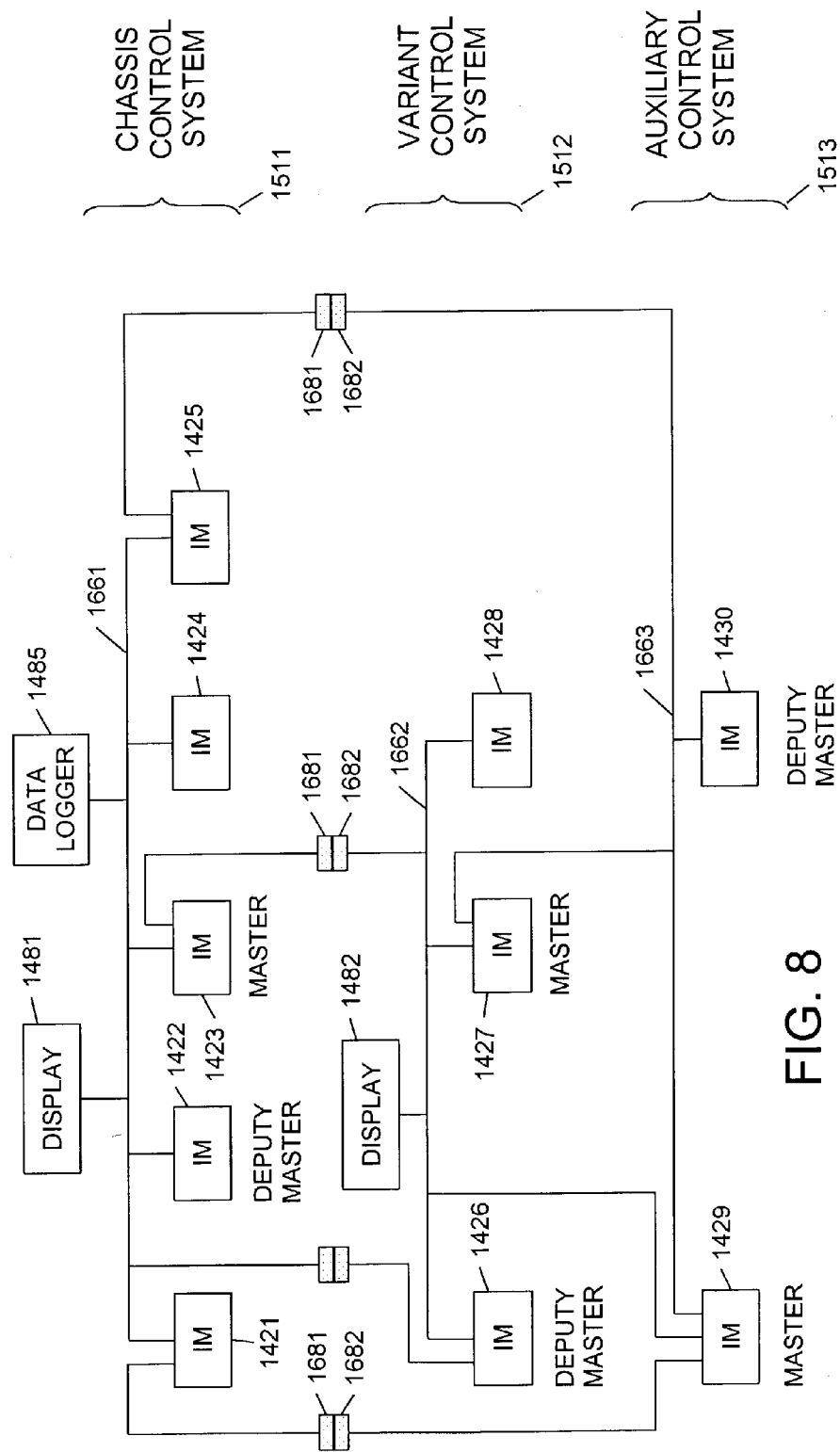
Figure 9:
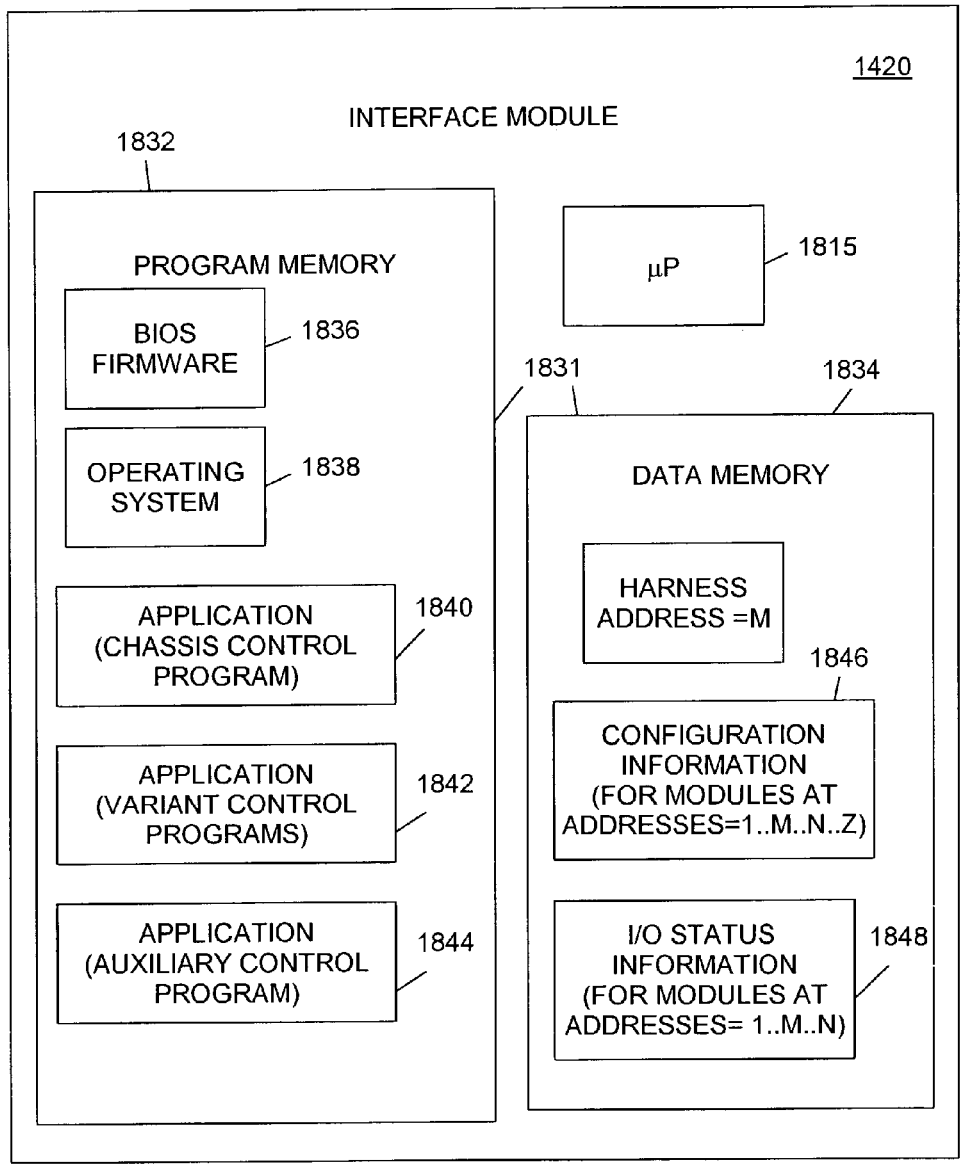
FIG. 9 is a diagram showing the memory contents of an exemplary interface module in greater detail.

Referring now also to FIGS. 7–9, the structure and interconnection of the interface modules 1420 is described in greater detail. Referring first to FIG. 7, the interconnection of the interface modules 1420 with a power source 1500 is described. The interface modules 1420 receive power from the power source 1500 by way of a power transmission link 1502. The interface modules 1420 are distributed throughout the vehicle 1410, with some of the interface modules 1420 being located on the chassis 1417 and some of the interface modules 1420 being located on the variant module 1413.

The control system is subdivided into three control systems including a chassis control system 1511, a variant control system 1512, and an auxiliary control system 1513. The chassis control system 1511 includes the interface modules 1421–1425 and the I/O devices 1441 and 1451, which are all mounted on the chassis 1417. The variant control system 1512 includes the interface modules 1426–1428 and the I/O devices 1442 and 1452, which are all mounted on the variant module 1413. The auxiliary control system 1513 includes the interface modules 1429–1430 and the I/O devices 1443 and 1453, which may be mounted on either the chassis 1417 or the variant module 1413 or both.

The auxiliary control system 1513 may, for example, be used to control a subsystem that is disposed on the variant module but that is likely to be the same or similar for all variant modules (e.g., a lighting subsystem that includes headlights, tail lights, brake lights, and blinkers). The inclusion of interface modules 1420 within a particular control system may also be performed based on location rather than functionality. For example, if the variant module 1413 has an aerial device, it may be desirable to have one control system for the chassis, one control system for the aerial device, and one control system for the remainder of the variant module. Additionally, although each interface module 1420 is shown as being associated with only one of the control systems 1511–1513, it is possible to have interface modules that are associated with more than one control system. It should also be noted that the number of sub-control systems, as well as the number of interface modules, is likely to vary depending on the application. For example, a mobile command vehicle is likely to have more control subsystems than a wrecker variant, given the large number of I/O devices usually found on mobile command vehicles.

The power transmission link 1502 may comprise a single power line that is routed throughout the vehicle 1410 to each of the interface modules 1420, but preferably comprises redundant power lines. Again, in order to minimize wiring, the interface modules 1420 are placed so as to be located as closely as possible to the input devices 1440 from which input status information is received and the output devices 1450 that are controlled. This arrangement allows the previously-described advantages associated with distributed data collection and power distribution to be achieved. Dedicated communication links, which may for example be electric or photonic links, connect the interface modules 1421–1430 modules with respective ones of the I/O devices, as previously described.

Referring next to FIG. 8, the interconnection of the interface modules 1420 by way of the communication network 1460 is illustrated. As previously indicated, the control system 1412 is subdivided into three control systems 1511, 1512 and 1513. In accordance with this arrangement, the communication network 1460 is likewise further subdivided into three communication networks 1661, 1662, and 1663. The communication network 1661 is associated with the chassis control system 1511 and interconnects the interface modules 1421–1425. The communication network 1662 is associated with the variant control system 1512 and interconnects the interface modules 1426–1428. The communication network 1663 is associated with the auxiliary control system 1513 and interconnects the interface modules 1429–1430. Communication between the control systems 1511–1513 occurs by way of interface modules that are connected to multiple ones of the networks 1661–1663. Advantageously, this arrangement also allows the interface modules to reconfigure themselves to communicate over another network in the event that part or all of their primary network is lost.

In practice, each of the communication networks 1661–1663 may be formed of two or more communication networks to provide redundancy within each control system. Indeed, the connection of the various interface modules 1420 with different networks can be as complicated as necessary to obtain the desired level of redundancy. For simplicity, these potential additional levels of redundancy will be ignored in the discussion of FIG. 8 contained herein.

The communication networks 1661–1663 may be implemented in accordance with SAE J1708/1587 and/or J1939 standards, or some other network protocol, as previously described. The transmission medium is preferably fiber optic cable for robustness.

When the variant module 1413 is mounted on the chassis 1417, connecting the chassis control system 1511 and the variant control system 1512 is achieved simply through the use of two mating connectors 1681 and 1682 that include connections for one or more communication busses, power and ground. The chassis connector 1682 is also physically and functionally mateable with connectors for other variant modules, i.e., the chassis connector and the other variant connectors are not only capable of mating physically, but the mating also produces a workable vehicle system. A given set of switches or other control devices 1651 on the dash (see FIG. 5) may then operate differently depending on which variant is connected to the chassis. Advantageously, therefore, it is possible to provide a single interface between the chassis and the variant module (although multiple interfaces may also be provided for redundancy). This avoids the need for a separate connector on the chassis for each different type of variant module, along with the additional unutilized hardware and wiring, as has conventionally been the approach utilized.

Upon power up, the variant control system 1512 and the chassis control system 1511 exchange information that is of interest to each other. For example, the variant control system 1512 may communicate the variant type of the variant module 1413. Other parameters may also be communicated. For example, information about the weight distribution on the variant module 1413 may be passed along to the chassis control system 1511, so that the transmission shift schedule of the transmission 1493 can be adjusted in accordance with the weight of the variant module 1413, and so that a central tire inflation system can control the inflation of tires as a function of the weight distribution of the variant. Similarly, information about the chassis can be passed along to the variant. For example, where a variant module is capable of being used by multiple chassis with different engine sizes, engine information can be communicated to a wrecker variant module so that the wrecker variant knows how much weight the chassis is capable of pulling. Thus, an initial exchange of information in this manner allows the operation of the chassis control system 1511 to be optimized in accordance with parameters of the variant module 1413, and vice versa.

Referring next to FIG. 9, an exemplary one of the interface modules 1420 is shown in greater detail. The interface modules 1420 each include a microprocessor 1815 that is sufficiently powerful to allow each interface module to serve as a central control unit. The interface modules are identically programmed and each include a memory 1831 that further includes a program memory 1832 and a data memory 1834. The program memory 1832 includes BIOS (basic input/output system) firmware 1836, an operating system 1838, and application programs 1840, 1842 and 1844. The application programs include a chassis control program 1840, one or more variant control programs 1842, and an auxiliary control program 1844. The data memory 1834 includes configuration information 1846 and I/O status information 1848 for all of the modules 1420–1430 associated with the chassis 1417 and its variant module 1413, as well as configuration information for the interface modules (N+1 to Z in FIG. 9) of other variant modules that are capable of being mounted to the chassis 1417.

It is therefore seen that all of the interface modules 1420 that are used on the chassis 1417 and its variant module 1413, as well as the interface modules 1420 of other variant modules that are capable of being mounted to the chassis 1417, are identically programmed and contain the same information. Each interface module 1420 then utilizes its network address to decide when booting up which configuration information to utilize when configuring itself, and which portions of the application programs 1840–1844 to execute given its status as a master or non-master member of one of the control systems 1511–1513. A master interface module may be used to provide a nexus for interface operations with devices external to the control systems 1511–1513. The interface modules are both physically and functionally interchangeable because the interface modules are capable of being plugged in at any slot on the network, and are capable of performing any functions that are required at that slot on the network.

This arrangement is highly advantageous. Because all of the interface modules 1420 are identically programmed and store the same information, the interface modules are physically and functionally interchangeable within a given class of vehicles. The use of a single type of interface module makes it easier to find replacement interface modules and therefore enhances the field serviceability of the control system 1412.

Additionally, as previously noted, each interface module 1420 stores I/O status information for all of the modules 1420–1430 associated with the chassis 1417 and its variant module 1413. Therefore, each interface module 1420 has total system awareness. As a result, it is possible to have each interface module 1420 process its own inputs and outputs based on the I/O status information in order to increase system responsiveness and in order to reduce the amount of communication that is required with the central control unit. The main management responsibility of the central control unit or master interface module above and beyond the responsibilities of all the other interface modules 1420 then becomes, for example, to provide a nexus for interface operations with devices that are external to the control system of which the central control unit is a part.

Referring now to FIGS. 10–13, a preferred technique for transmitting I/O status information between the interface modules 1420 will now be described. Although this technique is primarily described in connection with the chassis control system 1511, this technique is preferably also applied to the variant control system 1512 and the auxiliary control system 1513, and/or in the control system 12.

Figure 10:
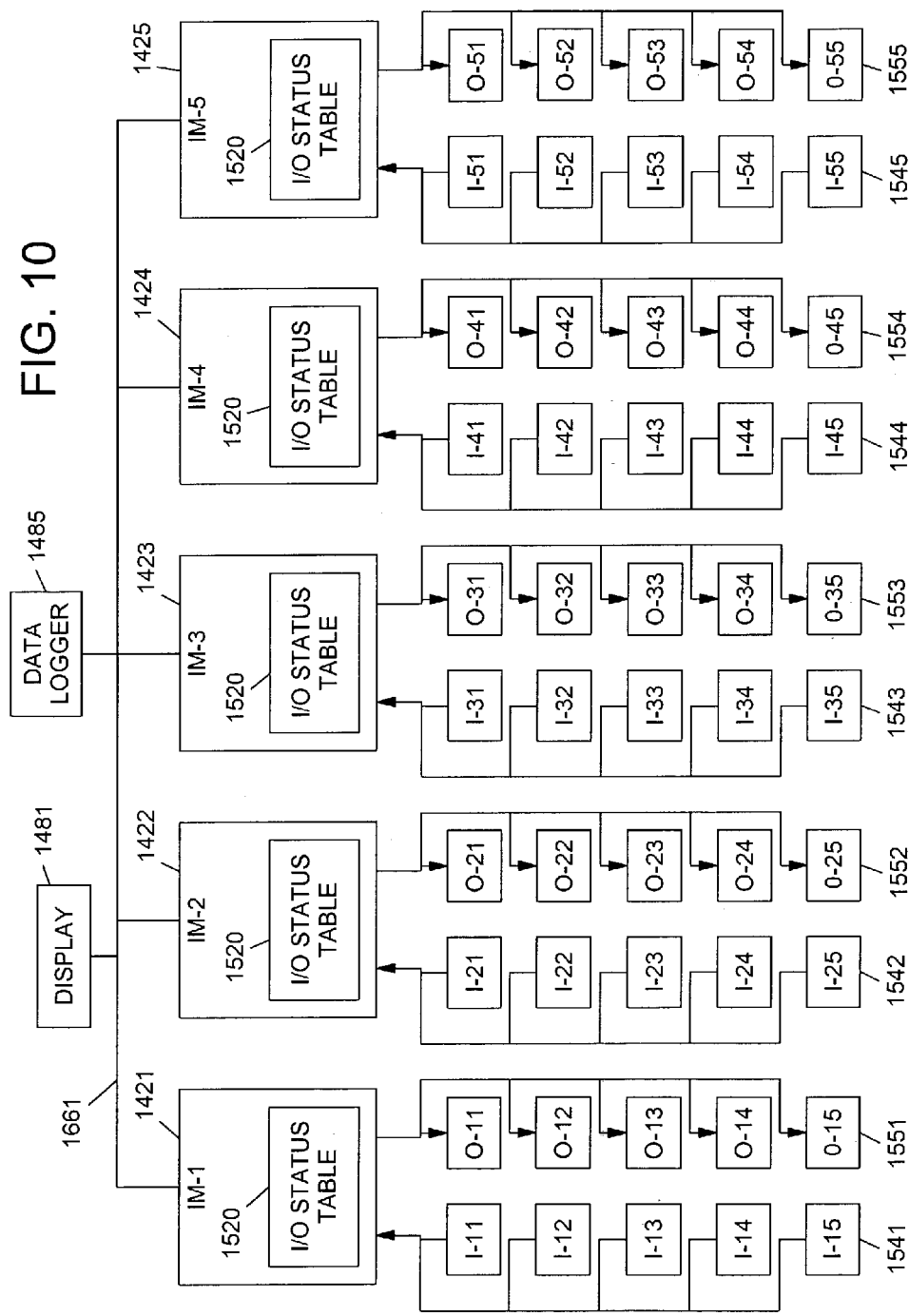
FIG. 10 is a block diagram of the control system of FIG. 5 showing selected aspects of the control system in greater detail.

Referring first to FIG. 10, as previously described, the chassis control system 1511 includes the interface modules 1421–1425, the input devices 1441, and the output devices 1451. Also shown in FIG. 10 are the display 1481, the data logger 1485, and the communication network 1661 which connects the interface modules 1421–1425. In practice, the system may include additional devices, such as a plurality of switch interface modules connected to additional I/O devices, which for simplicity are not shown. The switch interface modules may be the same as the switch interface modules 20 previously described and, for example, may be provided in the form of a separate enclosed unit or in the more simple form of a circuit board mounted with associated switches and low power output devices. In practice, the system may include other systems, such as a display interface used to drive one or more analog displays (such as gauges) using data received from the communication network 1661. Any additional modules that interface with I/O devices preferably broadcast and receive I/O status information and exert local control in the same manner as detailed below in connection with the interface modules 1421–1425. As previously noted, one or more additional communication networks may also be included which are preferably implemented in accordance with SAE J1708/1587 and/or J1939 standards. The communication networks may be used, for example, to receive I/O status information from other vehicle systems, such as an engine or transmission control system. Arbitration of I/O status broadcasts between the communication networks can be performed by one of the interface modules 1420.

To facilitate description, the input devices 1441 and the output devices 1451 have been further subdivided and more specifically labeled in FIG. 10. Thus, the subset of the input devices 1441 which are connected to the interface module 1421 are collectively labeled with the reference numeral 1541 and are individually labeled as having respective input states I-11 to I-15. Similarly, the subset of the output devices 1451 which are connected to the interface module 1421 are collectively labeled with the reference numeral 1551 and are individually labeled as having respective output states O-11 to O-15. A similar pattern has been followed for the interface modules 1422–1425, as summarized in Table I below:.

TABLE I

| Interface Module | Input Devices | Input States | Output Devices | Output States |
|---|---|---|---|---|
| 1421 | 1541 | I-11 to I-15 | 1551 | O-11 to O-15 |
| 1422 | 1542 | I-21 to I-25 | 1552 | O-21 to O-25 |
| 1423 | 1543 | I-31 to I-35 | 1553 | O-31 to O-35 |
| 1424 | 1544 | I-41 to I-45 | 1554 | O-41 to O-45 |
| 1425 | 1545 | I-51 to I-55 | 1555 | O-51 to O-55 |

Of course, although five input devices 1441 and five output devices 1451 are connected to each of the interface modules 1420 in the illustrated embodiment, this number of I/O devices is merely exemplary and a different number of I/O devices could also be used, as previously described.

The interface modules 1420 each comprise a respective I/O status table 1520 that stores information pertaining to the I/O states of the input and output devices 1441 and 1451. Referring now to FIG. 11, an exemplary one of the I/O status tables 1520 is shown. As shown in FIG. 11, the I/O status table 1520 stores I/O status information pertaining to each of the input states I-11 to I-15, I-21 to I-25, I-31 to I-35, I-41 to I-45, and I-51 to I-55 of the input devices 1541–1545, respectively, and also stores I/O status information pertaining to each of the output states O-11 to O-15, O-21 to O-25, O-31 to O-35, O-41 to O-45, and O-51 to O-55 of the output devices 1551–1555, respectively. The I/O status tables 1520 are assumed to be identical, however, each I/O status table 1520 is individually maintained and updated by the corresponding interface module 1420. Therefore, temporary differences may exist between the I/O status tables 1520 as updated I/O status information is received and stored. Although not shown, the I/O status table 1520 also stores I/O status information for the interface modules 1426–1428 of the variant control system 1512 and the interface modules 1429–1430 of the auxiliary control system 1513.

In practice, although FIG. 11 shows the I/O status information being stored next to each other, the memory locations that store the I/O status information need not be contiguous and need not be located in the same physical media. It may also be noted that the I/O status table 1520 is, in practice, implemented such that different I/O states are stored using different amounts of memory. For example, some locations store a single bit of information (as in the case of a digital input device or digital output device) and other locations store multiple bits of information (as in the case of an analog input device or an analog output device). The manner in which the I/O status table is implemented is dependent on the programming language used and on the different data structures available within the programming language that is used. In general, the term I/O status table is broadly used herein to encompass any group of memory locations that are useable for storing I/O status information.

Also shown in FIG. 11 are a plurality of locations that store intermediate status information, labeled IM-11, IM-21, IM-22, and IM-41. The intermediate states IM-11, IM-21, IM-22, and IM-41 are processed versions of selected I/O states. For example, input signals may be processed for purposes of scaling, unit conversion and/or calibration, and it may be useful in some cases to store the processed I/O status information. Alternatively, the intermediate states IM-11, IM-21, IM-22, and IM-41 may be a function of a plurality of I/O states that in combination have some particular significance. The processed I/O status information is then transmitted to the remaining interface modules 1420.

Figure 12:
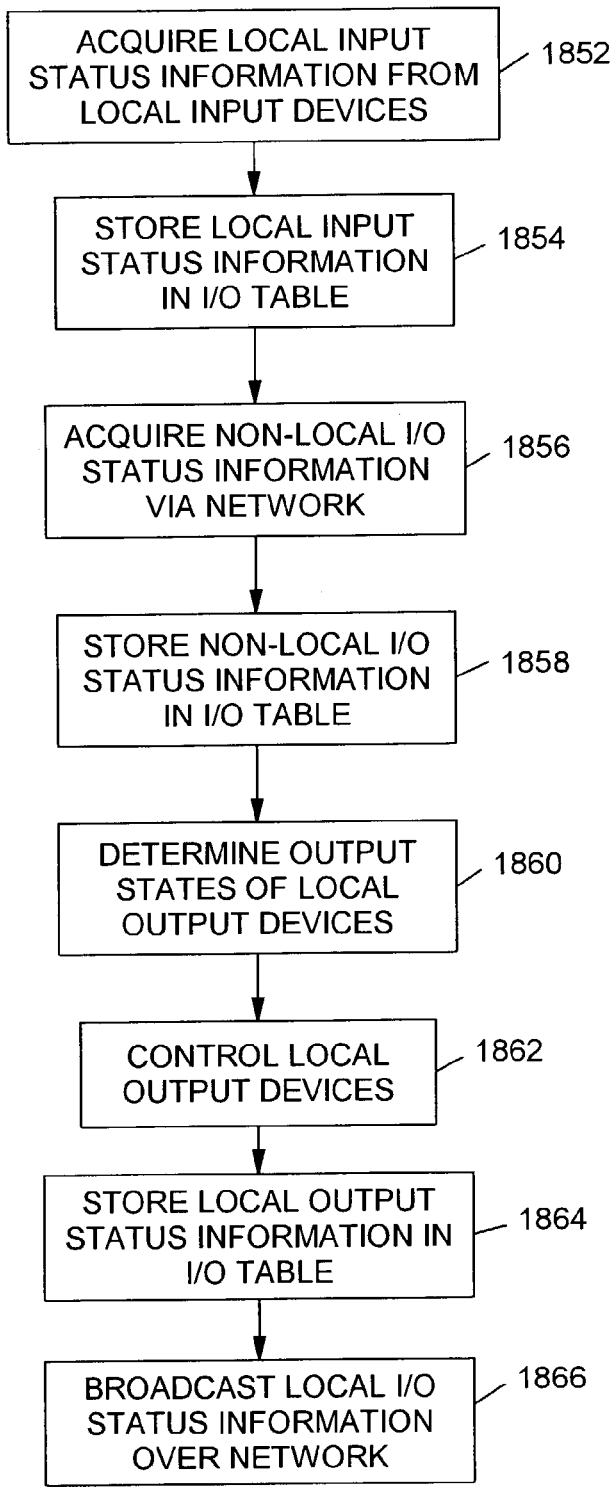
FIG. 12 is a flowchart describing the operation of the control system of FIG. 10 in greater detail.
Figure 13:
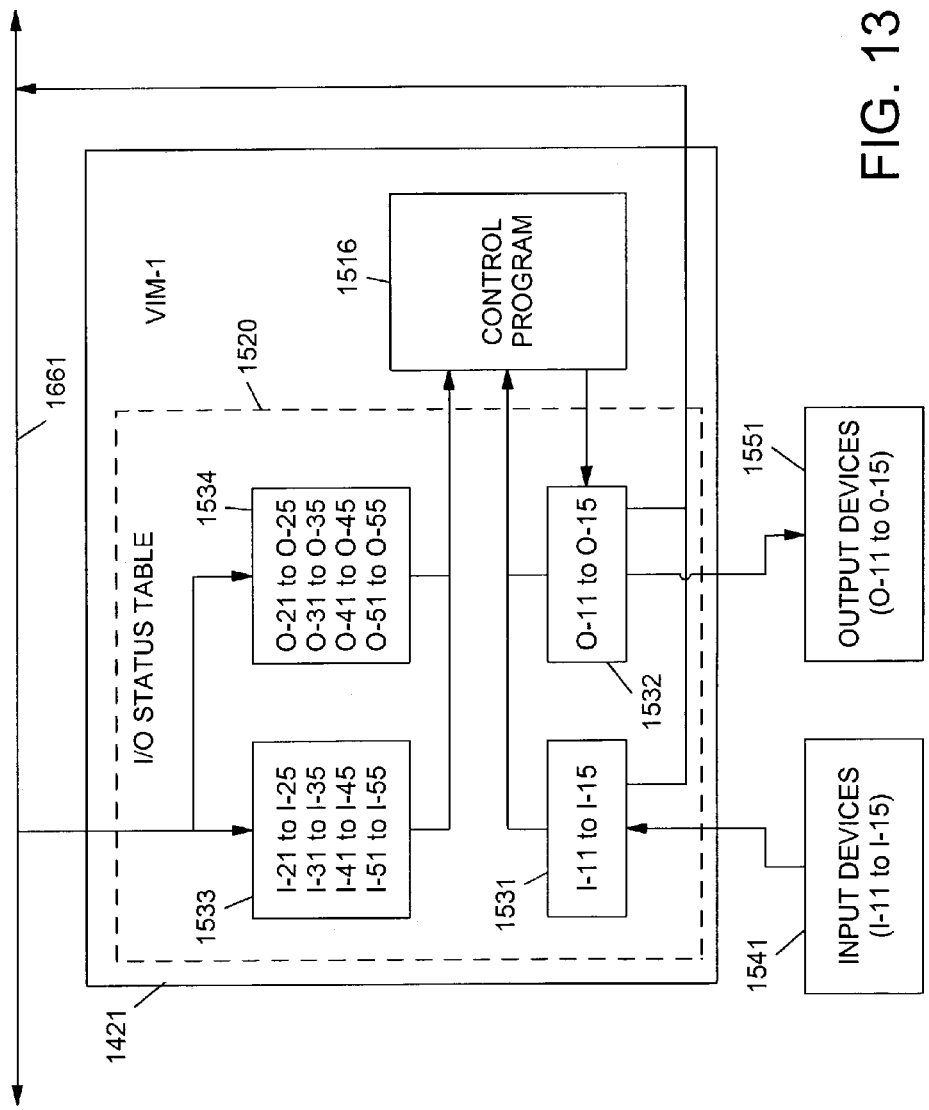
FIG. 13 is a data flow diagram describing data flow through an exemplary interface module during the process of FIG. 12.

Referring now to FIGS. 12–13, FIG. 12 is a flowchart describing the operation of the control system of FIG. 10, and FIG. 13 is a data flow diagram describing data flow through an exemplary interface module during the process of FIG. 12. As an initial matter, it should be noted that although FIG. 12 depicts a series of steps which are performed sequentially, the steps shown in FIG. 12 need not be performed in any particular order. In practice, for example, modular programming techniques are used and therefore some of the steps are performed essentially simultaneously. Additionally, it may be noted that the steps shown in FIG. 12 are performed repetitively during the operation of the interface module 1421, and some of the steps are in practice performed more frequently than others. For example, input information is acquired from the input devices more often than the input information is broadcast over the communication network. Although the process of FIG. 12 and the data flow diagram of FIG. 13 are primarily described in connection with the interface module 1421, the remaining interface modules 1422–1425 operate in the same manner.

At step 1852, the interface module 1421 acquires input status information from the local input devices 1541. The input status information, which pertains to the input states I-11 to I-15 of the input devices 1541, is transmitted from the input devices 1541 to the interface module 1421 by way of respective dedicated communication links. At step 1854, the input status information acquired from the local input devices 1541 is stored in the I/O status table 1520 at a location 1531. For the interface module 1421, the I/O devices 1541 and 1551 are referred to as local I/O devices since the I/O devices 1541 and 1551 are directly coupled to the interface module 1421 by way of respective dedicated communication links, as opposed to the remaining non-local I/O devices and 1542–1545 and 1552–1555 which are indirectly coupled to the interface module 1421 by way of the communication network 1661.

At step 1856, the interface module 1421 acquires I/O status information for the non-local input devices 1542–1545 and the non-local output devices 1552–1555 by way of the communication network 1661. Specifically, the interface module 1421 acquires input status information pertaining to the input states I-21 to I-25, I-31 to I-35, I-41 to I-45, I-51 to I-55 of the input devices 1542–1545, respectively, and acquires output status information pertaining to the output states O-21 to O-25, O-31 to O-35, O-41 to O-45, O-51 to O-55 of the output devices 1552–1555. The input status information and the output status information are stored in locations 1533 and 1534 of the I/O status table 1520, respectively.

At step 1860, the interface module 1421 determines desired output states O-11 to O-15 for the output devices 1551. As previously noted, each of the interface modules 1420 stores a chassis control program 1840, one or more variant control programs 1842, and an auxiliary control program 1844. The interface module 1421 is associated with the chassis control system 1511 and, therefore, executes a portion of the chassis control program 1840. (The portion of the chassis control program 1840 executed by the interface module 1421 is determined by the location of the interface module 1421 on the vehicle 1410, as previously described.) The interface module 1421 executes the chassis control program 1840 to determine the desired output states O-11 to O-15 based on the I/O status information stored in the I/O status table 1520. Preferably, each interface module 1420 has complete control of its local output devices 1450, such that only I/O status information is transmitted on the communication network 1460 between the interface modules 1420.

At step 1862, the interface module 1421 controls the output devices 1551 in accordance with the desired respective output states O-11 to O-15. Once the desired output state for a particular output device 1551 has been determined, control is achieved by transmitting a control signal to the particular output device 1551 by way of a dedicated communication link. For example, if the output is a digital output device (e.g., a headlight controlled in on/off fashion), then the control signal is provided by providing power to the headlight by way of the dedicated communication link. Ordinarily, the actual output state and the desired output state for a particular output device are the same, especially in the case of digital output devices. However, this is not always the case. For example, if the headlight mentioned above is burned out, the actual output state of the headlight may be "off," even though the desired output state of the light is "on." Alternatively, for an analog output device, the desired and actual output states may be different if the control signal is not properly calibrated for the output device.

At step 1864, the interface module 1421 stores output status information pertaining to the desired output states O-11 to O-15 for the output devices 1551 in the I/O status table 1520. This allows the output states O-11 to O-15 to be stored prior to being broadcast on the communication network 1661. At step 1866, the interface module 1421 broadcasts the input status information pertaining to the input states I-11 to I-15 of the input devices 1541 and the output status information pertaining to the output states O-11 to O-15 of the output devices 1551 over the communication network 1661. The I/O status information is received by the interface modules 1422–1425. Step 1866 is essentially the opposite of step 1856, in which non-local I/O status information is acquired by the interface module 1421 by way of the communication network 1661. In other words, each interface module 1420 broadcasts its portion of the I/O status table 1520 on the communication network 1661, and monitors the communication network 1661 for broadcasts from the remaining interface modules 1420 to update the I/O status table 1520 to reflect updated I/O states for the non-local I/O devices 1441 and 1451. In this way, each interface module 1420 is able to maintain a complete copy of the I/O status information for all of the I/O devices 1441 and 1451 in the system.

The interface modules 1423 and 1425 are used to transmit I/O status information between the various control systems 1511–1513. Specifically, as previously noted, the interface module 1423 is connected to both the communication network 1661 for the chassis control system 1511 and to the communication network 1662 for the variant control system 1512. The interface module 1423 is preferably utilized to relay broadcasts of I/O status information back and forth between the interface modules 1421–1425 of the chassis control system 1511 and the interface modules 1426–1428 of the variant control system 1512. Similarly, the interface module 1425 is connected to both the communication network 1661 for the chassis control system 1511 and the to the communication network 1663 for the auxiliary control system 1513, and the interface module 1425 is preferably utilized to relay broadcasts of I/O status information back and forth between the interface modules 1421–1425 of the chassis control system 1511 and the interface modules 1429–1430 of the auxiliary control system 1513.

The arrangement of FIGS. 10–13 is advantageous because it provides a fast and efficient mechanism for updating the I/O status information 1848 stored in the data memory 1834 of each of the interface modules 1420. Each interface module 1420 automatically receives, at regular intervals, complete I/O status updates from each of the remaining interface modules 1420. There is no need to transmit data request (polling) messages and data response messages (both of which require communication overhead) to communicate information pertaining to individual I/O states between individual I/O modules 1420. Although more I/O status data is transmitted, the transmissions require less overhead and therefore the overall communication bandwidth required is reduced.

This arrangement also increases system responsiveness. First, system responsiveness is improved because each interface module 1420 receives current I/O status information automatically, before the information is actually needed. When it is determined that a particular piece of I/O status information is needed, there is no need to request that information from another interface module 1420 and subsequently wait for the information to arrive via the communication network 1661. The most current I/O status information is already assumed to be stored in the local I/O status table 1520. Additionally, because the most recent I/O status information is always available, there is no need to make a preliminary determination whether a particular piece of I/O status information should be acquired. Boolean control laws or other control laws are applied in a small number of steps based on the I/O status information already stored in the I/O status table 1520. Conditional control loops designed to avoid unnecessarily acquiring I/O status information are avoided and, therefore, processing time is reduced.

It may also be noted that, according to this arrangement, there is no need to synchronize the broadcasts of the interface modules 1420. Each interface module 1420 monitors the communication network 1661 to determine if the communication network 1661 is available and, if so, then the interface module broadcasts the I/O status information for local I/O devices 1441 and 1451. (Standard automotive communication protocols such as SAE J1708 or J1939 provide the ability for each member of the network to monitor the network and broadcast when the network is available.) Although it is desirable that the interface modules rebroadcast I/O status information at predetermined minimum intervals, the broadcasts may occur asynchronously.

The technique described in connection with FIGS. 10–13 also provides an effective mechanism for detecting that an interface module 1420 has become inoperable. As just noted, the interface modules 1420 rebroadcast I/O status information at predetermined minimum intervals. Each interface module 1420 also monitors the amount of time elapsed since an update was received from each remaining interface module 1420. Therefore, when a particular interface module 1420 has become inoperable, the inoperability of the interface module 1420 can be detected by detecting the failure of the interface module 1420 to rebroadcast its I/O status information within a predetermined amount of time. Preferably, the elapsed time required for a particular interface module 1420 to be considered inoperable is several times the expected minimum rebroadcast time, so that each interface module 1420 is allowed a certain number of missed broadcasts before the interface module 1420 is considered inoperable. A particular interface module 1420 may be operable and may broadcast I/O status information, but the broadcast may not be received by the remaining interface modules 1420 due, for example, to noise on the communication network.

This arrangement also simplifies the operation of the data logger 1485 and automatically permits the data logger 1485 to store I/O status information for the entire control system 1412. The data logger 1485 monitors the communication network 1661 for I/O status broadcasts in the same way as the interface modules 1420. Therefore, the data logger 1485 automatically receives complete system updates and is able to store these updates for later use.

As previously noted, in the preferred embodiment, the interface modules 1423 and 1425 are used to transmit I/O status information between the various control systems 1511–1513. In an alternative arrangement, the interface module 1429 which is connected to all three of the communication networks 1661–1663 could be utilized instead. Although less preferred, the interface module 1429 may be utilized to receive I/O status information from each of the interface modules 1421–1428 and 1430, assemble the I/O status data into an updated I/O status table, and then rebroadcast the entire updated I/O status table 1520 to each of the remaining interface modules 1421–1428 and 1430 at periodic or aperiodic intervals. Therefore, in this embodiment, I/O status information for the all of the interface modules 1420 is routed through the interface module 1429 and the interface modules 1420 acquire I/O status information for non-local I/O devices 1440 and 1450 by way of the interface module 1429 rather than directly from the remaining interface modules 1420.

The preferred control systems and methods exhibit enhanced reliability and maintainability because it uses distributed power distribution and data collecting. The interface modules are interconnected by a network communication link instead of a hardwired link, thereby reducing the amount of wiring on the fire truck. Most wiring is localized wiring between the I/O devices and a particular interface module.

Additionally, the interface modules in the preferred systems are interchangeable units. If the control system were also applied to other types of equipment service vehicles (e.g., snow removal vehicles, refuse handling vehicles, cement/concrete mixers, military vehicles such as those of the multipurpose modular type, on/off road severe duty equipment service vehicles, and so on), the interface modules would even be made interchangeable across platforms since each interface module views the outside world in terms of generic inputs and outputs.

B. Airport Rescue Fire Fighting Vehicle

Figure 14:
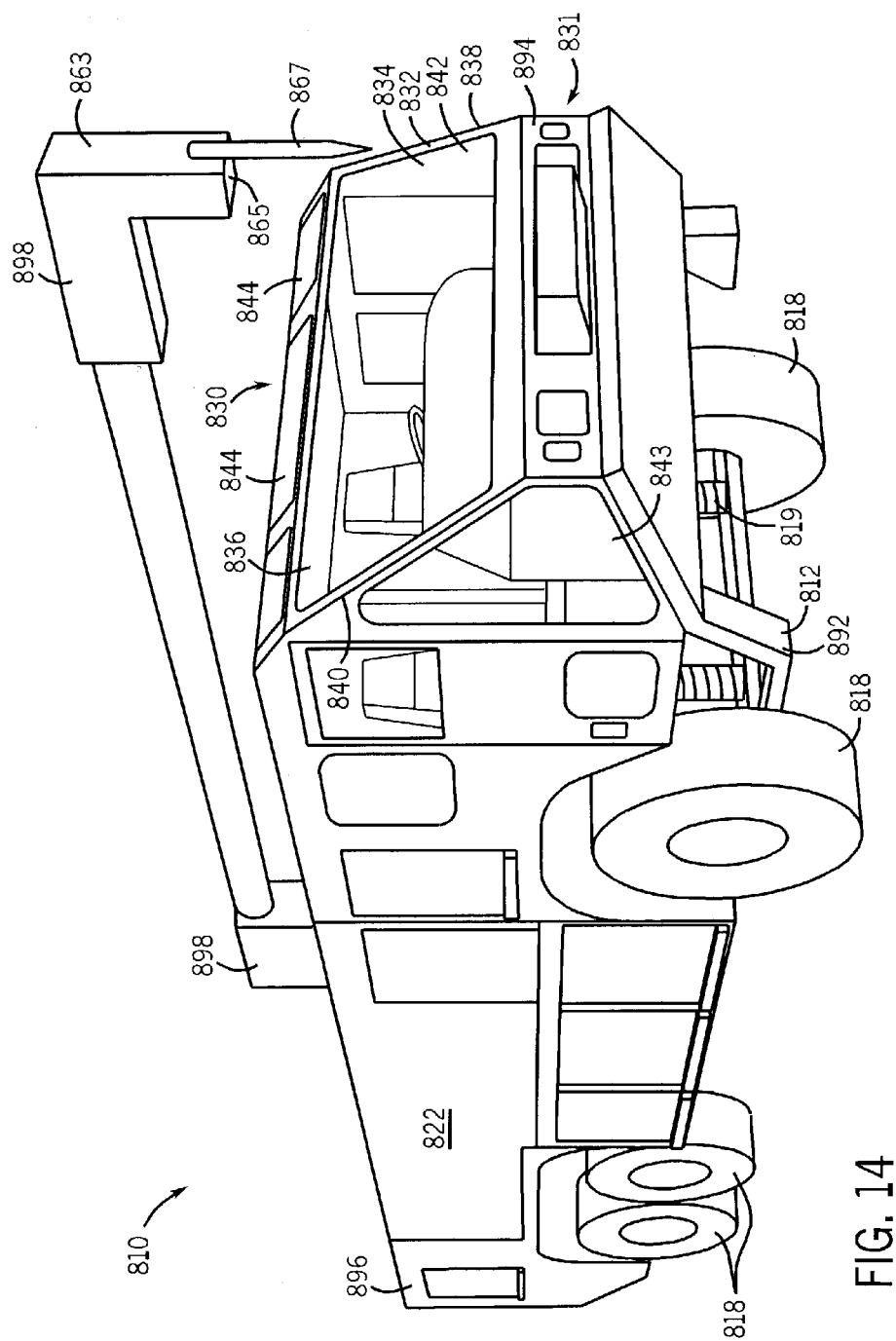
FIG. 14 is a perspective view of an airport rescue fire fighting vehicle having a control system according to one embodiment of the present invention.

Referring now to FIG. 14, a perspective view of another equipment service vehicle 810 that may utilize the control system 1412 is illustrated. In FIG. 14, the vehicle 810 is configured as an airport rescue fire fighting vehicle (ARFF), typically used to fight aircraft or fuel fires, typically either at an airport or at the scene of a crash site.

The vehicle 810 comprises a chassis or support structure 812 coupled to wheels 818. The wheels 818 form a multi-wheel arrangement, such as a four-wheel, six-wheel (as shown in FIG. 14) or eight-wheel arrangement. Preferably, all of the wheels 818 are driven ("all wheel drive"), although a subset of the wheels 818 such as two, four, or six of the wheels may also be driven. Other ground engaging motive members, such as a track system, may also be provided. Each wheel 818 is coupled to a modular independent suspension 819. The modular independent suspension 819 includes a coil spring suspension for steerable and non-steerable wheel assemblies and drive and non-drive axles. The modular independent suspension 819 is coupled to the support structure 812 and to each wheel 818 and wheel assembly of the vehicle 810. An example of such modular independent suspension 19 is more fully described in U.S. Pat. Nos. 5,538,274 and 5,820,150, hereby incorporated by reference. The vehicle configuration and suspension provide the vehicle 810, for example, with a static side slope stability of at least 25° and preferably at least 30°, and make it possible for the vehicle 810 to ascend/descend a 40% grade and preferably a 50% grade, making the vehicle 810 suitable for off-road, all terrain use.

The vehicle 810 further comprises a vehicle body 822 which is mounted on the support structure 812. Fire-fighting equipment 863 is typically controlled from an operators station 830 which typically is the vehicle cab 831. Fire-fighting equipment 863 can include, for example, a fluid (or other fire extinguishing agent) dispensing nozzle 865, a video camera, a spotlight, a penetrating probe 868, and the like. The nozzle 865 and the penetrating probe are mounted at the end of an articulated boom assembly. The penetrating probe 868 is used to forcibly penetrate the skin of an aircraft, so that fire extinguishing agent from the nozzle 865 may enter the interior of an aircraft. A fluid source can be mounted directly on the vehicle 810, can be towed on a separate trailer structure, or can be a fixed fluid source such as a lake, river or tank. If a fixed fluid source is used, the vehicle 810 is configured to pump the fluid from the fixed fluid source.

The operator station 830 for the vehicle 810 comprises a cab frame 832 coupled to the support structure 812. The cab frame 832 includes a window structure 834 which further includes angled windows 842, 843 proximate each end 838, 840 of a front-facing windshield 836. The windshield 836 can be of any convenient size shape. In the embodiment of FIG. 14, the windshield 836 has a trapezoidal shape with the top of the windshield 836 leaning back towards the vehicle body 822. Such orientation provides an unobstructed view in front of the vehicle 810 including a substantial view of the surface immediately in front of the vehicle 810. The first side window 842 and the second side window 843 which are angled towards the vehicle front and towards the windshield 836. The cab frame 832 provides a mount for each angled side window 842, 843 proximate each end 838, 840 of the windshield 836. The angled orientation of the two side windows 842, 843 provide additional vision capability to the operator of the vehicle 810 at the corners of the operator station 830 of the vehicle 810. In FIG. 14, the side windows 842, 843 have a triangular shape, however, other shapes, such as trapezoidal, can be used. Other types of mounting mechanisms for the side window 842, 843 is contemplated, for example, the windshield 836 and side windows 842, 843 can be mounted in a unibody structure.

Additional transparent panels such as overhead transparent panels 844 can be mounted in the cab frame 832 and provide additional vision capability to an operator of the vehicle 810. In FIG. 14, three overhead transparent panels 844 are shown, although it should be understood that fewer or additional transparent panels 844 may be utilized. The operator station 30 can also be provided with additional openings, storage spaces, doors, and the like.

Figure 15:
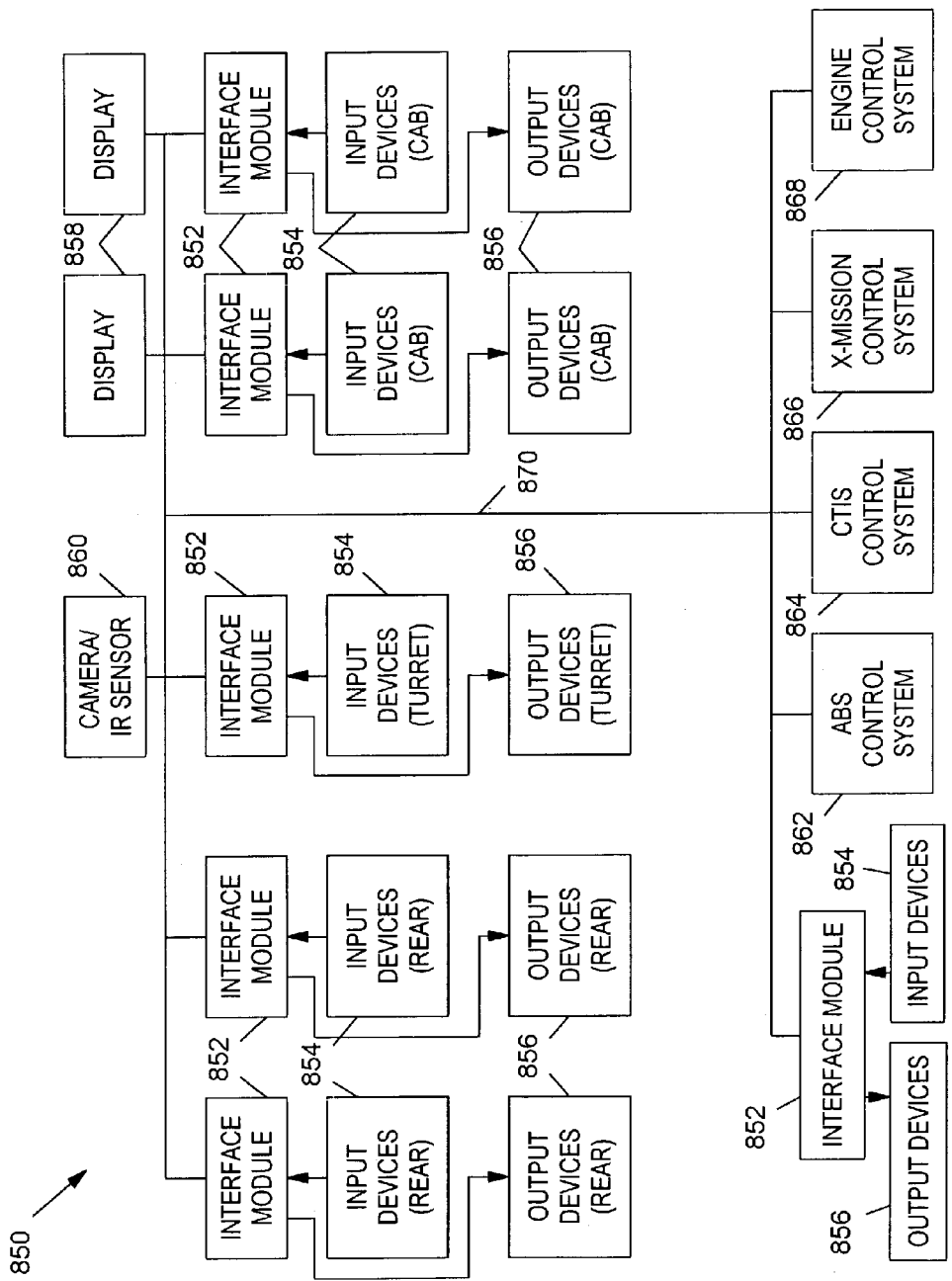
FIG. 15 is a block diagram of the control system of FIG. 14 showing selected aspects of the control system in greater detail.

Referring now to FIG. 15, a control system 850 for the vehicle 810 is shown. The control system 850 may be constructed in accordance with any of the control system embodiments described above. For example, the vehicle 810 may be implemented as an electric vehicle, as described in connection with FIGS. 25–33 of U.S. Prov. No. 60/360,479 and U.S. Ser. No. 10/326,907, and/or include the network assisted scene management features of FIGS. 34–41 of U.S. Prov. No. 60/360,479 and U.S. Ser. No. 10/326,907, and/or be implemented to include the network-assisted monitoring, service and/or repair features described in connection with FIGS. 42–67 of U.S. Prov. No. 60/360,479 and U.S. Ser. No. 10/326,907. The control system 850 comprises a plurality of interface modules 852, a plurality of input devices 854, a plurality of output devices 856, a plurality of displays 858, a camera and/or infrared sensor 860, an antilock brake control system 862, a central tire inflation control system 864, a transmission system 866, an engine control system 868, and a communication network 870.

The interface modules 852 are preferably constructed and operate as discussed above in connection with the interface modules 1420. In the context of an ARFF vehicle, the input devices 854 and output devices 856 may be the same types of input devices and output devices as discussed above in connection with the fire fighting vehicle 10. For example, the I/O devices may include driving instrumentation (such as a speedometer, tachometer, fuel gage, various temperature gauges, and the like), vehicle operation instrumentation (such as switches and indicators for various lighting and warning signals on the vehicle, operator comfort controls such as air conditioning, heat, or such other instrumentation relating to vehicle operation), equipment operation instrumentation (such as controls and indicators relating to the various fluids used by the in fighting a fire, the controls relating to the mixing of a foaming agent with water, the rate of dispensing the fluids, control of various fire-fighting equipment such as boom mounted nozzles or skid pan or bumper mounted nozzles, and auxiliary controls such as pump and valve controls), and an auxiliary control instrumentation (such as switches, controls and indicators for non-emergency and non-driving vehicle functions, for example, wide lights, auxiliary generator controls, mirror controls, central tire inflation control, dome light, step lights, and the like). In one embodiment, these four different types of instrumentation are segmented and arranged into groups for easy access by an operator. In the embodiment of FIG. 14, the vehicle 10 may include a turret nozzle 865 that dispenses fire fighting agent on a fire. Therefore, the control system 850 may include the features and devices described in connection with the turret control system 612 described in U.S. Prov. No. 60/360,479, filed Feb. 28, 2002.

The interface modules 852 are coupled to each other by way of the communication network 870 which is used to communicate I/O status data between the interface modules 852, as described elsewhere in the specification. The interface devices 852 are also coupled to the antilock brake control system 862, the central tire inflation control system 864, the transmission system 866, and the engine control system 868 by way of the communication network 870. In this regard, it may be noted that the communication network 870 may be implemented using a single network, or may be multiple networks coupled together using a gateway (such as one of the interface modules 852 or another device). Other devices may also be coupled to the network 870, such as operator interfaces or displays 858 used to view data transmitted on the network 870 or a camera/IR sensors 860 used to acquire additional data. These and other such devices are described elsewhere in the specification.

Figure 16:
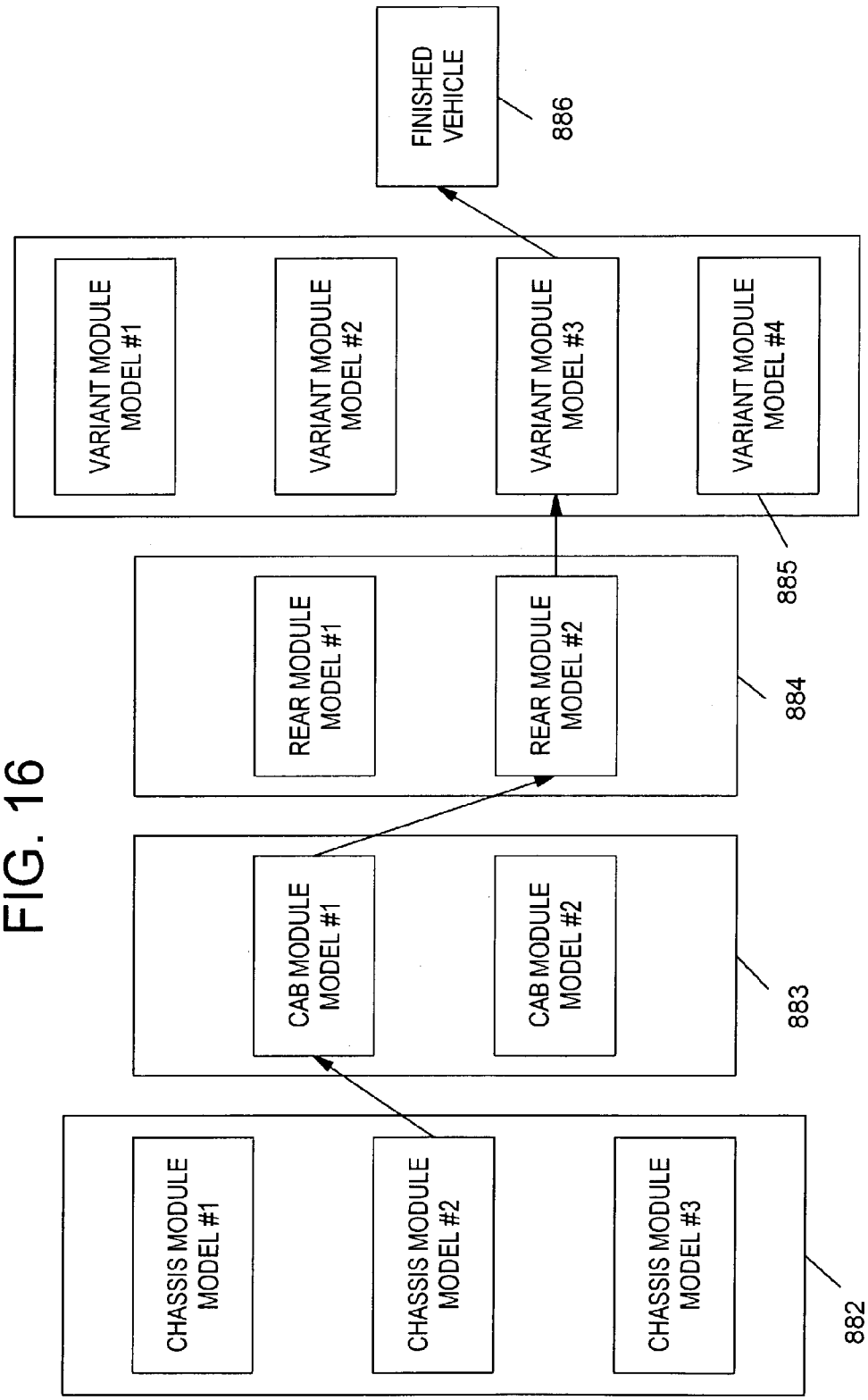
FIG. 16 is a vehicle manufacturing process used in connection with the vehicle of FIG. 14.
Figure 17:
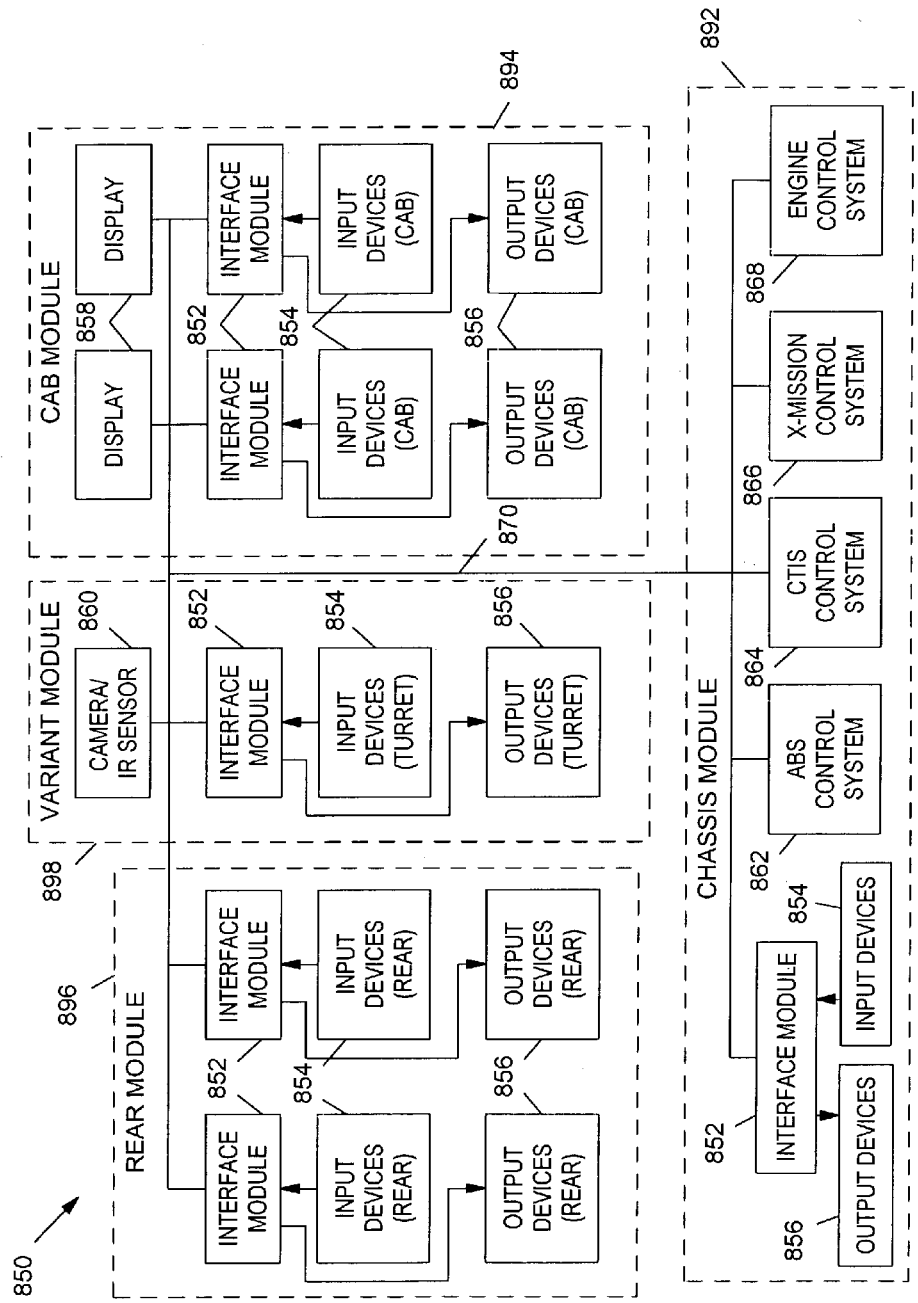
FIG. 17 is a block diagram of the control system of FIG. 15 modified to reflect the manufacturing process of FIG. 16.

Referring now to FIGS. 16–17, the vehicle 810 preferably has a construction which is at least partially modular, thereby facilitating manufacturing of different vehicle configurations, and ultimately allowing greater commonality of parts for easier servicing by the vehicle owner. For example, as previously noted, in the embodiment of FIG. 14, the vehicle 810 is configured as an ARFF vehicle. In the context of an ARFF vehicle, it may be desirable to provide vehicles with several different water carrying capacities, such as a 1500 gallon capacity vehicle, a 3000 gallon capacity vehicle, and a 4500 gallon capacity vehicle. Additionally, it may be desirable to provide different types of vehicles used for different purposes, but based on a largely identical design. For example, in FIG. 14, rather than being configured as an ARFF vehicle capable of carrying a large water payload, the vehicle may be configured as other types of vehicles capable of carrying other types of payloads (e.g., waste/refuse, pallets, cargo, and so on).

FIG. 16 shows a vehicle manufacturing process 880 according to another preferred aspect of the invention. As shown in FIG. 16, the manufacturing process starts at step 882 with the selection of a chassis module. For example, a vehicle with a larger payload carrying capacity may require a chassis that is longer and that has eight wheels instead of six or four wheels. Therefore, different chassis modules may be provided (three in the illustrated embodiment) depending on the desired payload carrying capacity of the vehicle 810. It may also be desirable to offer the vehicle 810 as a diesel-driven vehicle or as a hybrid electric vehicle, and the two different configurations may require different types of chassis modules. Then, at steps 883–885, additional modules are mounted to the selected chassis module. (Although steps 883–885 are shown as a sequence of steps, it should be understood that these steps may generally be performed concurrently.) The additional modules are mounted on top of the selected chassis module, such that their weight is supported by the chassis module. At step 883, a cab module is mounted to the chassis module. The cab module houses the operator compartment. For example, if the vehicle 810 is an ARFF vehicle, one cab module may be chosen that has a significant amount of room for carrying fire fighters, each of whom is carrying a significant amount of equipment. On the other hand, if the vehicle 10 is a waste disposal vehicle, the cab module may have a different configuration to include compartments for other equipment and/or storage. At step 884, a rear module is mounted to the chassis. The rear module may include access panels for electrical circuit breakers, filters, and so on, depending on the type of vehicle implemented by the vehicle 810. Again, two or more rear modules configurations may be provided which meet different requirements for different vehicle types. For example, some vehicle types may require a rear loading capability which would make a rear module with a lower height profile more desirable. At step 885, a variant module is mounted to the chassis. For example, in FIG. 14, the variant module is a turret module comprising an extendable boom and other associated equipment. Alternatively, if the vehicle 810 implements a palletized load system (PLS) type vehicle, a variant module with an articulated arm capable of loading and unloading pallets from the vehicle 810 may be provided. If the vehicle 810 implements a wrecker vehicle, a variant module that implements a towing mechanism may be provided. At step 886, the finished vehicle is produced. FIG. 14 shows the vehicle 810 with a chassis module 892, a cab module 894, a rear module 896 and a variant module 898.

FIG. 17 is similar to FIG. 15 except that it has been modified to reflect a modular construction. Thus, boxes have been added to show that various ones of the devices 852–868 are located on different ones of the modules shown in FIG. 17. For example, in the context of the cab module 894, all of the operator controls and instrumentation are preferably electronic controls. For example, the steering and throttle controls are electronic controls and are selected ones of the input devices 854 that connect to one or more of the interface modules 852. Therefore, mounting the cab module 894 on the chassis module 892 consists essentially of mechanically attaching the cab module to the chassis module 892 (e.g., bolting the cab module 894 to the chassis module 892) and then connecting the cab module 894 to the communication network 870 and to power. During manufacturing, it is therefore possible to construct the cab module 894 separately, and then mount a substantially completed cab module to the chassis module. The rear module 896 and the variant module 898 may be constructed and mounted in the same manner. In some cases, the owner of the vehicle may be provided with the ability to reconfigure the vehicle 810 in the field, such that an ARFF vehicle may be converted to a PLS vehicle by removing and replacing various ones of the cab, rear, and variant modules.

Throughout the specification, numerous advantages of preferred embodiments have been identified. It will be understood of course that it is possible to employ the teachings herein so as to without necessarily achieving the same advantages. Additionally, although many features have been described in the context of a vehicle control system comprising multiple modules connected by a network, it will be appreciated that such features could also be implemented in the context of other hardware configurations. Further, although various figures depict a series of steps which are performed sequentially, the steps shown in such figures generally need not be performed in any particular order. For example, in practice, modular programming techniques are used and therefore some of the steps may be performed essentially simultaneously. Additionally, some steps shown may be performed repetitively with particular ones of the steps being performed more frequently than others. Alternatively, it may be desirable in some situations to perform steps in a different order than shown.

As previously noted, the construction and arrangement of the elements of the turret control system shown in the preferred and other exemplary embodiments are illustrative only. Although only a few embodiments of the present inventions have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. In the claims, any means-plus-function clause is intended to cover the structures described herein as performing the recited function and not only structural equivalents but also equivalent structures.

Although certain advantages are described herein, it will be appreciated that the techniques below may also be used to achieve other and/different advantages without necessarily achieving any of the advantageous features described herein. Other substitutions, modifications, changes and omissions may be made in the design, operating conditions and arrangement of the preferred and other exemplary embodiments without departing from the scope of the present inventions as expressed in the appended claims.

What is claimed is:

1. A vehicle kit for manufacturing a vehicle, comprising:
(A) a plurality of chassis modules including
   (1) a first chassis module, the first chassis module further comprising a first plurality of input devices, a first plurality of output devices, a first plurality of interface modules, and a first communication network, the first plurality of interface modules being coupled to each other by way of the first communication network, the first plurality of interface modules each being coupled to the first plurality of input devices and the first plurality of output devices, and the first plurality of interface modules being configured to control the first plurality of output devices;
   (2) a second chassis module, the second chassis module having a different number of load-carrying wheels than to first chassis module, the second chassis module further comprising a second plurality of input devices, a second plurality of output devices, a second plurality of interface modules, and a second communication network, the second plurality of interface modules being coupled to each other by way of the second communication network, the second plurality of interface modules each being coupled to the second plurality of input devices and the second plurality of output devices, and the second plurality of interface modules being configured to control the second plurality of output devices;
(B) a cab module, the cab module further comprising a third plurality of input devices, a third plurality of output devices, a third plurality of interface modules, and a third communication network, the third plurality of interface modules being coupled to each other by way of the third communication network, the third plurality of interface modules each being coupled to the third plurality of input devices and the third plurality of output devices, and the third plurality of interface modules being operative to control the third plurality of output devices based on input status information from the third plurality of input devices;
wherein both the first and second chassis modules are configured to receive the cab module and have the cab module mounted thereon as a substantially complete stand-alone unit.

2. The vehicle kit according to claim 1, wherein the first and second chassis modules have different load carrying capacities.

3. The vehicle kit according to claim 1, wherein the cab module is a first cab module, wherein the vehicle kit comprises a second cab module, and wherein the first and second cab modules are configured to have different passenger-carrying capacities.

4. The vehicle kit according to claim 1, wherein the vehicle is an airport rescue and fire fighting vehicle and wherein the first and second chassis modules have different water-carrying capacities.

5. The vehicle kit according to claim 1, further comprising means for attaching the cab module to either of the first and second chassis modules.

6. The vehicle kit according to claim 5, wherein the means for attaching is a bolt assembly.

7. The vehicle kit according to claim 1, wherein both the first and second chassis modules are configured to receive the cab module and have the cab module mounted thereon by a process consisting essentially of attaching the substantially complete cab module to the respective chassis module and connecting the cab module to the communication network included with the respective chassis module and connecting the cab module to power.

8. The vehicle kit according to claim 7, wherein both the first and second chassis modules are configured to have the cab module attached thereto by a bolt assembly.

9. The vehicle according to claim 1, wherein the cab module comprises a plurality of windows having a trapezoidal shape with tops of the windows leaning back toward a vehicle body of the vehicle.

10. The vehicle according to claim 1, wherein each of the plurality of interface modules from the first and second chassis modules and the cab module stores I/O status information for each of the remaining ones of the plurality of interface modules from the respective first and second chassis modules and the cab module to provide each of the plurality of interface modules from the respective first and second chassis modules and the cab module with total system awareness, and wherein each of the plurality of interface modules from the first and second chassis modules and the cab modules processes its own inputs and outputs based at least in part on the I/O status information received from the remaining ones of the plurality of interface modules from the respective first and second chassis modules and the cab module.

* * * * *